(12) United States Patent
Knepple et al.

(10) Patent No.: US 7,591,365 B2
(45) Date of Patent: Sep. 22, 2009

(54) NETWORKABLE ZONE CONTROL MODULES AND METHOD AND CONVEYOR SYSTEM INCORPORATING THE SAME

(75) Inventors: Robert Knepple, Kalamazoo, MI (US); Scott Klien, Portage, MI (US); David T. Klien, Portage, MI (US)

(73) Assignee: Humphrey Products Company, Kalamazoo, MI (US)

( * ) Notice: Subject to any disclaimer, the term of this patent is extended or adjusted under 35 U.S.C. 154(b) by 242 days.

(21) Appl. No.: 11/464,042

(22) Filed: Aug. 11, 2006

(65) Prior Publication Data

US 2006/0289273 A1 Dec. 28, 2006

Related U.S. Application Data

(62) Division of application No. 10/383,890, filed on Mar. 7, 2003, now Pat. No. 7,280,889.

(60) Provisional application No. 60/319,140, filed on Mar. 8, 2002.

(51) Int. Cl.
*B65G 43/00* (2006.01)

(52) U.S. Cl. .............. 198/460.1; 198/464.1; 198/464.2; 700/224; 700/229; 700/230

(58) Field of Classification Search .............. 198/460.1, 198/464.1, 464.2, 781.01, 781.06; 700/223, 700/224, 228, 229, 230
See application file for complete search history.

(56) References Cited

U.S. PATENT DOCUMENTS

| | | | |
|---|---|---|---|
| 4,174,777 A | 11/1979 | Riehel | |
| 4,383,605 A | 5/1983 | Harwick | |
| 5,060,785 A | 10/1991 | Garrity | |
| 5,186,308 A | 2/1993 | Munro | |
| 5,228,558 A | 7/1993 | Hall | |
| 5,285,887 A | 2/1994 | Hall | |
| 5,318,167 A | 6/1994 | Bronson et al. | |
| 5,429,225 A | 7/1995 | Schiesser et al. | |
| 5,582,286 A | 12/1996 | Kalm et al. | |
| 5,862,907 A | 1/1999 | Taylor | |
| 6,021,888 A | 2/2000 | Itoh et al. | |
| 6,035,999 A | 3/2000 | Hall | |
| 6,047,812 A | 4/2000 | Horn et al. | |
| 6,190,354 B1 | 2/2001 | Sell et al. | |
| 6,193,054 B1 | 2/2001 | Henson et al. | |
| 6,240,335 B1 | 5/2001 | Wehrung et al. | |
| 6,302,266 B1 | 10/2001 | DeFrancisco et al. | |
| 6,315,104 B1 | 11/2001 | Ebert | |
| 6,370,447 B1 | 4/2002 | Miyazaki | |
| 6,415,914 B2 | 7/2002 | Itoh et al. | |
| 6,460,683 B1 | 10/2002 | Pfeiffer | |
| 6,522,944 B2 | 2/2003 | Wielebski et al. | |
| 6,827,202 B2 * | 12/2004 | Topmiller et al. ...... 198/781.05 |

(Continued)

*Primary Examiner*—Douglas A Hess
(74) *Attorney, Agent, or Firm*—McGarry Bair PC

(57) ABSTRACT

A package control conveyor system comprises a plurality of independently-controllable package conveying units each of which comprises a zone control module operably connected to a package sensing device and a package conveying unit for selectively activating and deactivating the package conveying unit, wherein the zone control modules are communicably interconnected upstream and downstream so that each zone control module can selectively activate and deactivate its associated package conveying unit in response to information provided by one or more upstream and/or downstream zone control modules.

92 Claims, 23 Drawing Sheets

U.S. PATENT DOCUMENTS

| | | | |
|---|---|---|---|
| 6,860,381 B2 * | 3/2005 | Newsom et al. | 198/781.05 |
| 6,996,454 B1 * | 2/2006 | Edstrom | 700/230 |
| 7,032,736 B2 * | 4/2006 | Guidetti et al. | 198/347.1 |
| 7,035,714 B2 * | 4/2006 | Anderson et al. | 700/228 |
| 7,104,395 B2 * | 9/2006 | Brown et al. | 198/781.06 |
| 7,243,781 B2 * | 7/2007 | Taylor | 198/783 |
| 7,263,409 B2 * | 8/2007 | LeVasseur et al. | 700/228 |
| 7,280,889 B2 * | 10/2007 | Knepple et al. | 700/224 |
| 7,360,638 B2 * | 4/2008 | Ko et al. | 198/575 |

\* cited by examiner

| Switch | Function | Position | Operation |
|---|---|---|---|
| 1,2 | Sleep Mode | 0 0 | Sleep 'OFF' |
|  |  | 0 1 | Sleep 'ON' - 2 sec. |
|  |  | 1 0 | Sleep 'ON' - 5 sec. |
|  |  | 1 1 | Sleep 'ON' - 8 sec. |
| 3 | Jam Detection | 0 | Jam 'OFF' |
|  |  | 1 | Jam 'ON' (Enabled) |
| 4 | External Slug Detection | 0 | External Slug 'OFF' |
|  |  | 1 | External Slug 'ON' (Enabled) |
| 5 | Auto-Slug (A.S.) Mode | 0 | A.S. 'OFF' |
|  |  | 1 | A.S. 'ON' (Enabled) |

NETWORKABLE ZONE CONTROL MODULES AND METHOD AND CONVEYOR SYSTEM INCORPORATING THE SAME

CROSS-REFERENCE TO RELATED APPLICATION

This application is a divisional of U.S. patent application Ser. No. 10/383,890, filed Mar. 7, 2003, now U.S. Pat. No. 7,280,889, issued Oct. 9, 2007, which claims the benefit of U.S. provisional application Ser. No. 60/319,140, filed Mar. 8, 2002, which are incorporated herein in their entirety.

BACKGROUND OF THE INVENTION

1. Field of the Invention

This invention relates to a conveyor system having zone control modules which can detect product on an attached conveyor. More specifically, the invention relates to a zone control module which can be programmed with specific features and operational criteria by various hard wired or wireless devices. Additionally, the invention relates to a conveyor control system that can have several interconnected zone control modules which can pass operational information to one another using a simplified communications protocol, and to an interface which translates the simplified protocol to a standard communications network protocol that can communicate with a standard PC-based or networked computer environment.

2. Description of the Related Art

Conveyor control systems typically include one or more "zone" control modules which let a controller for the conveyor system detect the status (i.e. location) of objects being conveyed on the system. An example of such a system is disclosed in U.S. Pat. No. 6,302,266, issued Oct. 16, 2001, which discloses a conveyor system comprising a series of rollers rotatably mounted to a frame. The rollers are organized into roller "zones" in which the rollers in a zone operate in concert. A continuous-loop drive belt passes beneath the rollers, and is selectively brought into contact with a selected roller zone by a pneumatic actuator which, when actuated, extends to abut the belt with a selected number of rollers, and, when retracted, removes the abutment of the belt with the rollers. A plurality of interconnected zone control modules and photo-electric sensing devices (often referred to as "photo-eyes") are mounted in a suitable fashion at regular intervals to the frame, with each zone control module and photo-eye operably associated with a specific zone. Each zone control module incorporates a solenoid-driven pneumatic valve for delivering pressurized air to the pneumatic actuator serving that module. A signal from the photo-eye, indicating the presence or absence of a package on the associated zone, will activate the zone control module and the pneumatic actuator for a specific zone.

One problem with the prior art network or PC-based conveyor systems is that they are typically server-based systems, where every zone control module must be separately connected to the server. Furthermore, each zone control module must have a unique ID, which must be reprogrammed into the system control program when the zone control module is replaced, or new modules added. Wiring must typically be run to each zone control module, and then bussed to a controller which must decipher which zone the information came from.

This problem has been addressed by providing conveyor control modules with microprocessors which can deliver additional information via standard networking/communication protocols (i.e. RS-232). However, there remain problems with the prior art conveyor systems. These prior art devices require accurate positioning information to determine the zone control module's location in a series of modules. Often, standard networking protocols require a unique zone control module ID for each module, making replacement and repair to conveyor control systems difficult.

SUMMARY OF THE INVENTION

A system for controlling a zone in a conveyor system for handling objects traveling therealong comprises a conveyor separated into a plurality of contiguous independently-controllable zones, a plurality of actuators, each actuator operably interconnected to a particular one of the plurality of independently-controllable zones, wherein each actuator operates the movement of objects in the particular zone, a plurality of detectors, each detector associated with a particular one of the plurality of independently-controllable zones, wherein each detector detects the presence of an object in the particular zone, and a plurality of controllers having a signal processor/generator therein, each controller operably interconnected to a particular one of the plurality of actuators for selective actuation of the particular actuator, each controller also operably interconnected to a particular one of the plurality of detectors for detection of at least one object in the particular zone, wherein each controller local to a particular zone is also operably interconnected to at least one of an adjacent upstream controller and an adjacent downstream controller, wherein the signals generator of the controller is adapted to send and receive signal to and from the at least one of the adjacent upstream controller and the adjacent downstream controller responsive to at least one event.

DESCRIPTION OF THE PREFERRED EMBODIMENT

Figure 1:
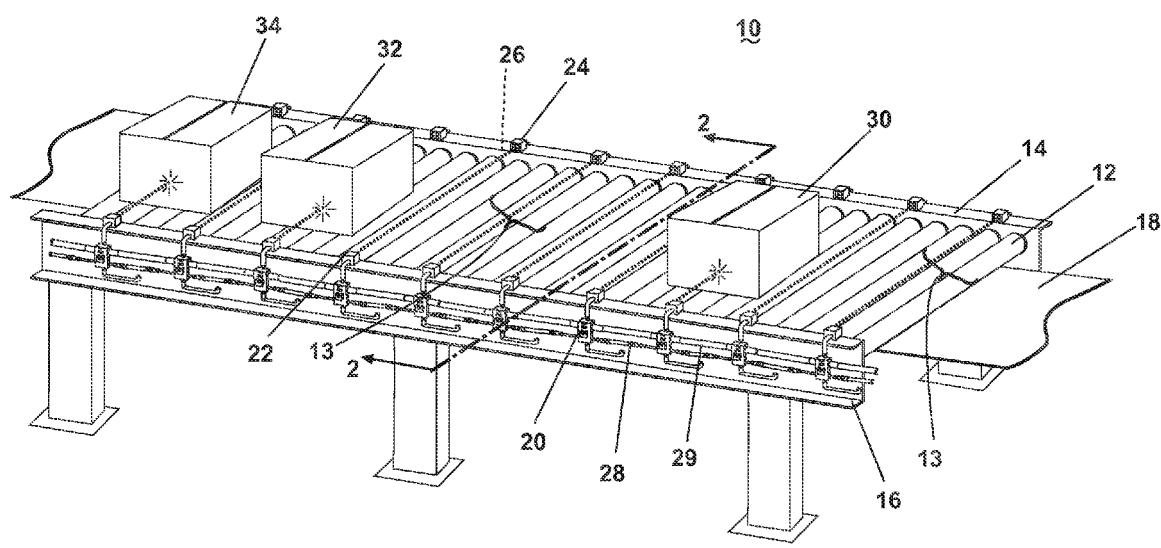
FIG. 1 is a perspective view of an embodiment comprising a portion of a conveyor system comprising microprocessor-based networkable zone control modules according to the invention.
Figure 2:
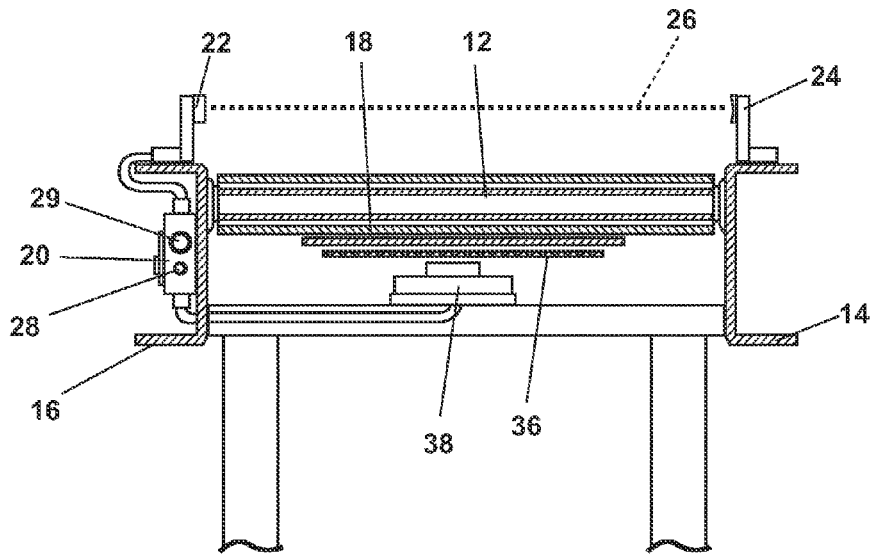
FIG. 2 is a sectional view taken along line 2-2 of FIG. 1.
Figure 3:
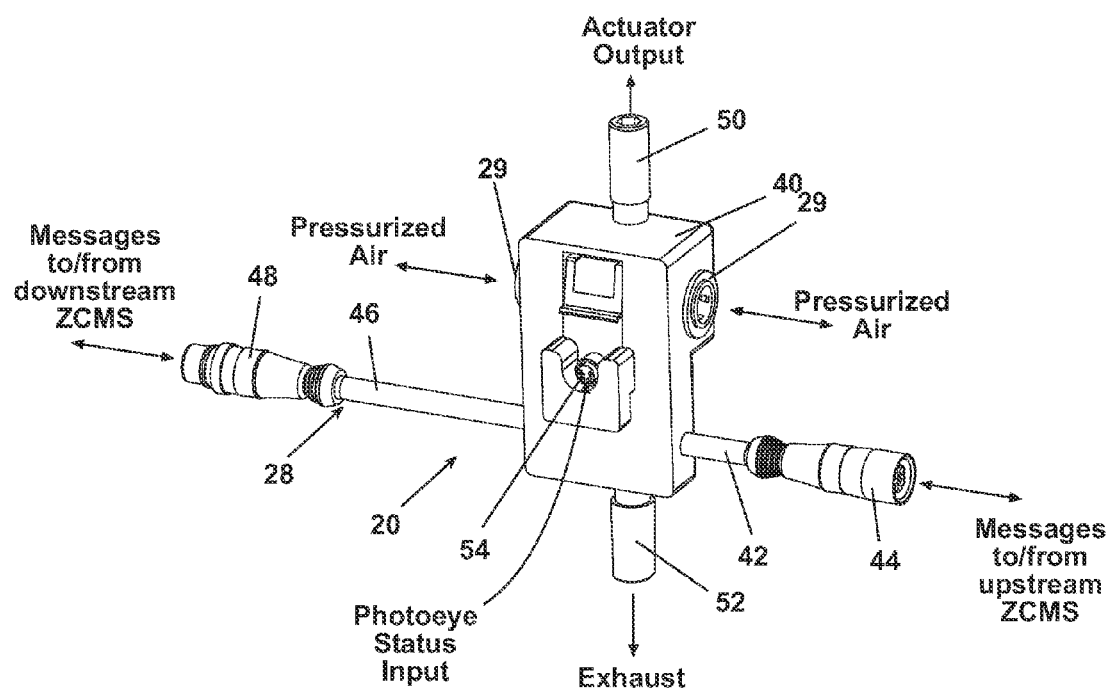
FIG. 3 is a close-up perspective view of a networkable zone control module as shown in FIG. 1.

Turning now to the drawings, and to FIGS. 1-3 in particular, a preferred embodiment of the invention comprises a conveyor system 10 comprising a series of rollers 12 rotatably mounted between a back rail 14 and a front rail 16 in a conventional manner. The rollers 12 can be operably organized into roller units 13, or "zones," comprising a selected number of rollers 12 in which the rollers 12 in a zone 13 will operate in concert. A continuous-loop drive belt 18 moves beneath the rollers 12, and is selectively brought into contact with a selected zone 13 by a drive plate 36 which is raised against an overlying zone 13 by a pneumatic actuator 38. A plurality of interconnected zone control modules 20 are mounted in a suitable fashion, such as by a clip integrated into the zone control module 20 or a threaded fastener, at regular intervals to the front rail 16, with each zone control module 20 operably associated with a specific zone 13. It will be understood that the particular mounting arrangement of the modules 20 to the rails 14, 16 is not critical to the invention, and any suitable arrangement will be apparent to one skilled in the art.

Each zone control module 20 is interconnected with an associated photo-electric sensing device 22, such as an optical sensor or a photo-eye, in a peer-to-peer network according to the invention. The optical sensors 22 are mounted to the front rail 16 through a suitable sensor mount, such as a bracket, and are adapted to detect the physical presence of an object, such as a carton (shown by example by reference numerals 30, 32, 34) being conveyed along the conveyor system 10. Each optical sensor 22 is provided with a mating receiver 24 mounted to the back rail 14 so that an optical signal or photoelectric beam, shown in FIG. 1 as a sensor beam 26, is transmitted between the optical sensor 22 and the receiver 24. The optical sensor 22 and the receiver 24 are shown operating in a direction perpendicular to the direction of travel of the conveyor system 10, but the operation direction shown in FIG. 1 shall not be construed as limiting on the invention and can be skewed relative to the direction of travel of the conveyor system 10 without departing from the scope of the invention. The zone control modules 20 are communicably interconnected by control cables 28 adapted for the transmission of digital information, including information from the optical sensors 22, among the zone control modules 20. The control cables 28 also supply power to the optical sensors 22 and the zone control modules 20.

Selected optical sensors 22 can be programmed as "smart photo-eyes" for reporting package movement conditions along the conveyor system 10 to an installation computer system 68. Whenever the photoelectric beam from the smart photo-eye is interrupted, the zone control module associated with the smart photo-eye sends a signal to the main computer or server 68. This information, combined with similar information from the other smart photo-eyes provides real-time reporting on the available capacity of the conveyor system 10. Alternatively, the computer 68 can periodically request information from each smart photo-eye according to a preselected schedule.

In the preferred embodiment, the zone control module 20 comprises a housing 40 adapted to enclose a solenoid-operated pneumatic valve (not shown) and a digital microprocessor (not shown). The housing 40 is provided with suitable fittings for fluid connection of a common air line 29 interconnecting adjoining zone control modules 20 as shown in FIG. 1, and fluidly connecting the zone control modules 20 to a source of pressurized air (not shown). The pneumatic valve is fluidly connected to the air line 29 and to the pneumatic actuator 38 via a pneumatic actuator outlet 50. The pneumatic valve fluidly interconnects the air line 29 with the pneumatic actuator 38 for selectively activating and deactivating the pneumatic actuator 38. A pneumatic actuator exhaust port 52 is also fluidly connected to the pneumatic valve for selectively exhausting air from the pneumatic actuator 38 when the pneumatic actuator 38 is deactivated.

There are several terms used herein which may have a further definition beyond their ordinary meaning and, thus, are set forth below in Table 1.

TABLE 1

| TERM | DEFINITION |
|---|---|
| ACCUMU-LATION | A condition wherein, if a LOCAL MODULE receives an accumulation signal from DS1, the pneumatic valve is turned OFF. |
| AUTO-SLUG | An operational mode in which a zone control module which is pre-configured to accept/generate an AUTO-SLUG signal will activate a LOCAL pneumatic valve when the LOCAL MODULE generates or receives an AUTO-SLUG signal from a downstream zone control module. |
| DS1 | First zone control module removed from the LOCAL MODULE in the direction of conveyor travel. |
| DS2 | Second zone control module removed from the LOCAL MODULE in the direction of conveyor travel. |
| EXTREME DOWN-STREAM MODULE (EDM) | A zone control module which can be configured for an auto detection condition or an installation system-configured condition. For auto detection, a termination plug is placed on the uncoupled cable end. This protects the connectors and attaches the signal wires to ground. By grounding the signal wires, the EDM module automatically detects its unique location and responds to events appropriately. For an installation system configuration, the EDM module is mapped in the system software. During initial start up, the EDM module is configured for its unique location and responds to events appropriately. The EDM module also releases and accumulates as dictated by signals transmitted from the installation computer system. |
| JAM | An operational mode reflecting one or more jammed packages so that a LOCAL P.E. remains in a "blocked" state, the DSI and DS2 P.E.s remained "unblocked," and the LOCAL VALVE is in an "on" state after a predetermined amount of time, i.e. the JAM TIMER. If the JAM TIMER is allowed to expire, the LOCAL VALVE is left turned "on" in an attempt to "clear" the jam, and the LOCAL MODULE passes a JAM "ON" signal to US1, terminating any slug or auto-slug operations upstream, stopping moving product. Normal operation begins when the LOCAL P.E. is clear. If the LOCAL MODULE is the recipient of a JAM signal from DS1, the LOCAL MODULE turns the LOCAL VALVE "off" and begins accumulation. |

TABLE 1-continued

| TERM | DEFINITION |
|---|---|
| | This accumulation propagates upstream. If a LOCAL P.E. change in state does not occur within the JAM TIMER, any slug or auto-slug operations are terminated, and a JAM signal is transmitted to US1 and the interpreter. If the LOCAL P.E. clears, then a JAM CLEARED signal is transmitted to US1 and the interpreter. If a JAM signal is received from DS1, then the LOCAL MODULE enters an accumulation condition. If a JAM CLEARED signal is received from US1, then the LOCAL MODULE enters a release condition. |
| JAM TIMER | A predetermined amount of time, $T_j$, to detect a JAM by monitoring the LOCAL P.E., and the DS1 and DS2 P.E.s. |
| LOCAL | A zone control module under the influence of selected zone control modules located immediately upstream and downstream, i.e. US1, US2, DS1, DS2. |
| P.E. | Photo-eye; a photo-electric, product sensing device. |
| RELEASE | A condition of the Extreme Downstream Module (EDM) wherein, if a RELEASE signal is received from US1, the LOCAL VALVE is turned "on." |
| SLEEP MODE | An operational mode in which, after a predetermined amount of time, i.e. the SLEEP TIMER, the LOCAL VALVE is turned "off" until a WAKE-UP signal is received. The SLEEP TIMER is started when the LOCAL, US1, and US2 P.E.s are cleared. If the P.E.s change state, the SLEEP TIMER is reset. If the SLEEP TIMER expires prior to a change in the P.E. state, the LOCAL VALVE is turned "off." |
| SLEEP TIMER | A predetermined amount of time, $T_s$, to wait before turning the LOCAL VALVE "off." |
| SLUG | An operational mode in which a plurality of zone control modules are signaled to activate their VALVES to convey moving product irrespective of P.E. inputs. |
| SMART SENSOR (P.E.) | An operational mode in which, if a zone control module is designated as a SMART SENSOR, the LOCAL P.E. status is transmitted to the interpreter for diagnostic purposes. |
| US1 | The first zone control module removed from the LOCAL MODULE in the direction opposite to the direction of conveyor travel. |
| US2 | The second zone control module removed from the LOCAL MODULE in the direction opposite to the direction of conveyor travel. |
| VALVE | A solenoid valve incorporated into each zone control module. The circuit board logic turns the VALVE "on" or "off" based on external inputs. |
| WAKE-UP | A signal that is transmitted to the LOCAL MODULE from US1 or US2 when the US1 or US2 P.E.s become blocked. This signal "wakes up" the LOCAL MODULE and returns the LOCAL MODULE to normal operation. A LOCAL MODULE P.E. can also create a WAKE-UP signal when it indicates a "blocked" condition. |

A microprocessor comprises a programmable digital processor in the zone control module 20 operatively connected to a downstream control cable 42 and an upstream control cable 46 for operably interconnecting adjacent zone control modules 20 in series, as shown in FIG. 1. The microprocessor can process information in a conventional manner, such as in 8-bit bytes, each byte conveying information as to the type of information processed, the message or command processed, and a counter. For example, a first byte can identify the type of message being sent. A second byte can contain the actual message content. The third byte is simply a counter that is initiated at some predetermined value (such as 0 or 1) and incremented by each zone control module 20 that passes the message along through the number of interconnected zone control modules 20 in a contiguous series. The microprocessor is preferably pre-programmed to perform a logic process, shown in FIGS. 9-26, and a hierarchy process shown in FIGS. 27A and 27B. Further description of the messaging protocol employed by peer-to-peer networked zone control modules 20 will be provided in greater detail below.

Figure 4:
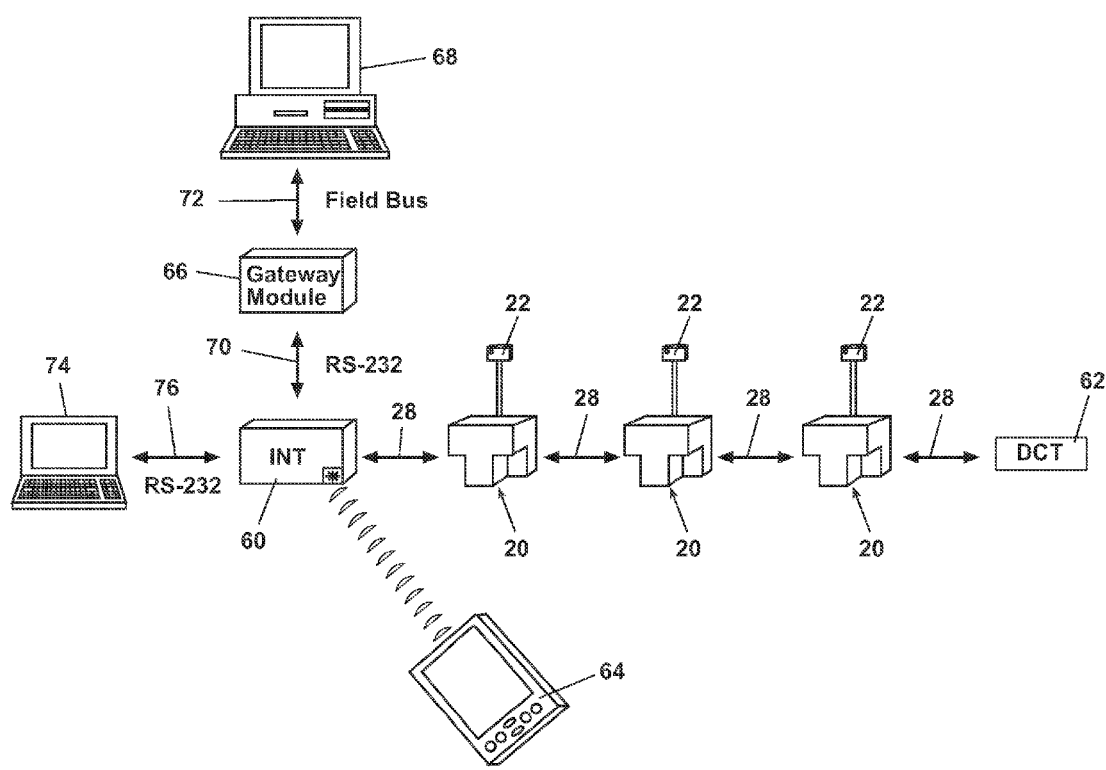
FIG. 4 is a configuration drawing of a control system for the conveyor system shown in FIG. 1 showing a series of networked zone control modules according to the invention interconnected to a prior art server-based system via an interpreter also according to the invention via conventional interconnections.

There are various communications protocols employed during operable interconnection of the zone control modules 20, the interpreter 60 and a master/server computer 68 (such as that typically used in a Field Bus environment), as shown in FIG. 4.

A master/slave concept is used to control communications between the various system elements:
- master/server installation computer 68 or temporarily installed computers 74 to the interpreters 60,
- interpreters 60 to zone control modules 20, or
- zone control module 20 to zone control module 20, with the master/server installation computer 68 serving as the ultimate "master" in the above listed combinations. The master in this master/slave concept is always upstream of the slave. For example, the interpreter 60 is a slave to either the master/server installation computer 68 or the temporarily installed computer 74 while the most upstream zone control module 20 is a slave to the interpreter 60. Additionally, a downstream zone control module 20 is the slave to an upstream zone control module 20.

A baud clock can be generated by the master and sent to the slave to send or retrieve data/status information. The data signal level is changed by the master or slave during the logic "low" level of the baud clock and read by the master or slave during the logic "high" level of the baud clock.

With respect to the zone control modules 20 and the master/slave implementation, an upstream end point of a series of interconnected zone control modules 20 can be determined by the absence of the baud clock. To determine a downstream endpoint, an upstream master control module polls the downstream zone control module (slave) for acknowledgment (ACK) as is further described below. If no ACK signal is received from the downstream endpoint zone control module (a slave), the master upstream zone control module determines that zone control module to be the downstream endpoint. If an ACK is received from a particular polled zone control module, the endpoint determination is passed to the next successive downstream zone control module via the master/slave concept.

The upstream master zone control module can send any size data packets, and terminates with an end-of-signal marker (e.g., such as an ACK signal). The ACK signals the slave zone control module that the master zone control module has finished transmitting and has set the data line as an input and that it is available for the slave zone control module to transmit its data/status. A slave zone control module can send any size data packet to the master zone control module ending with an end-of-message marker (e.g., the last data item being an ACK). The ACK signal not only signals the upstream master zone control module that a downstream zone control module is present, it also signals that the downstream slave zone control module is no longer driving the data line and the upstream master zone control module can now have output drive access of it. If no ACK is received from a zone control module, it is assumed that a downstream zone control module is not present and the master zone control module is at a downstream endpoint.

Several examples of data protocols will now be described with the understanding that they are by example only, and that other communications protocols or methods can be used without departing from the scope of this invention.

With respect to the data protocol used in these examples, data is transmitted in the following example format. There is an initial start bit followed by eight data bits (bit 7 is used to determine a packet type, e.g., if bit 7=1 it is a control byte, if bit 7=0, it is a data byte), and is terminated with one stop bit. The following table identifies some example codes used in the protocol:

| Data | Definition |
| --- | --- |
| FF | Packet Start |
| AA | ACK |
| 00-7F | Data |

Using the above-described communication codes, several example message formats will now be described for communication between a computer 68, 74, the interpreter 60 and the various zone control modules 20.

The following table describes communication from the interpreter 60 to the various zone control modules 20.

| Configuration Packet: From Interpreter 60 to Zone Control Modules 20 | |
| --- | --- |
| Byte 1 | Header (0x81) |
| Byte 2 | Length # bytes in packet not including header or length but including checksum. |
| Byte 3 | Node Number (ADDRESS). If MSB is set then address is "ALL" nodes. |
| Byte 4 | Bit0  Sleep Enabled (Y/N)<br>Bit1  Jam Enabled (Y/N)<br>Bit2  External Slug Enabled (Y/N)<br>Bit3  Auto Slug Enabled (Y/N)<br>Bit4  Smart Eye (Y/N)<br>Bit5  Sleep Timer Length to Follow (Y/N)<br>Bit6  Jam Timer Length to Follow (Y/N)<br>Bit7  Slug Line (Y/N) |
| Byte 5 | Sleep OR Jam timer value if at least 1 timer selected. If neither selected, no data byte. |
| Byte 6 | Jam timer value if both selected. If only one or neither, no data byte. |
| Byte N | Checksum. 1 byte sum of all bytes excluding header and checksum. |

The following table describes communication from the various zone control modules 20 to the interpreter 60.

| Status Packet: From Nodes to Int. Controller | |
| --- | --- |
| Byte 1 | Header (0x80) |
| Byte 2 | Length. No. of bytes in packet not including header or length but including checksum. |
| Byte 3 | Node no (e.g., "Address"). |
| Byte 4 | Data.<br>Byte1<br>Bit0  PhotoEye (0 = off, 1 = on)<br>Bit1  Solenoid (0 = off, 1 = on)<br>Bit2-7 Available for use (all 0's by default) |
| Byte 5 | Checksum. 1 byte sum of all bytes excluding header and checksum. |

The following table describes a configuration communication between an external computer 68, 74 and the various zone control modules 20.

| Configuration Packet: From External Computer 68, 74 to Zone Control Modules 20 | |
| --- | --- |
| Byte 1 | Header(0x81) |
| Byte 2 | Length. No. of bytes in packet not including header or length but including checksum. |
| Byte 3 | Node number (e.g., "Address"). If MSB is set then address is "ALL" nodes. |
| Byte 4 | Data.<br>Bit0  Sleep Enabled (Y/N)<br>Bit1  Jam Enabled (Y/N)<br>Bit2  External Slug Enabled (Y/N)<br>Bit3  Auto Slug Enabled (Y/N)<br>Bit4  Smart Eye (Y/N)<br>Bit5  Slug Line (Y/N)<br>Bit6  Available (defaults to 0)<br>Bit7  Available (defaults to 0) |
| Byte 5 | Sleep OR Jam timer value if at least 1 timer selected. If neither selected, no data byte. |
| Byte 6 | Jam timer value if both selected. If only one or neither, no data byte. |
| Byte N | Checksum. 1 byte sum of all bytes excluding header and checksum. |

The following table describes a configuration request communication between an external computer 68, 74 and the various zone control modules 20.

| Configuration Request Packet: From External Computer 68, 74 to Zone Control Modules 20 | |
| --- | --- |
| Byte 1 | Header (0x81) |
| Byte 2 | Length. No. of bytes in packet not including header or length but including checksum. |
| Byte 3 | Node number (e.g., "Address"). If MSB is set then address is "ALL" nodes. |
| Byte 4 | Data.<br>Bit0  0<br>Bit1  0<br>Bit2  0<br>Bit3  0<br>Bit4  0<br>Bit5  0<br>Bit6  1<br>Bit7  1 |
| Byte 5 | Checksum. 1 byte sum of all bytes excluding header and checksum. |

The following table describes a configuration request communication between the various zone control modules 20 and an external computer 68, 74 to indicate the status of a particular zone control module 20.

| Status Packet: From Zone Control Modules 20 to External Computer 68, 74 | |
| --- | --- |
| Byte 1 | Header (0x80) |
| Byte 2 | Length. No. of bytes in packet not including header or length but including checksum. |
| Byte 3 | Node no. (e.g., "Address"). |
| Byte 4 | Data.<br>Bit0  PhotoEye (0 = off, 1 = on)<br>Bit1  Solenoid (0 = off, 1 = on)<br>Bit2  Sleep Enabled (Y/N)<br>Bit3  Jam Enabled (Y/N)<br>Bit4  External Slug Enabled (Y/N)<br>Bit5  Auto Slug Enabled (Y/N)<br>Bit6  Smart Eye (Y/N)<br>Bit7  Slug Line (Y/N) |
| Byte 5 | Checksum. 1 byte sum of all bytes excluding header and checksum. |

Figure 6:
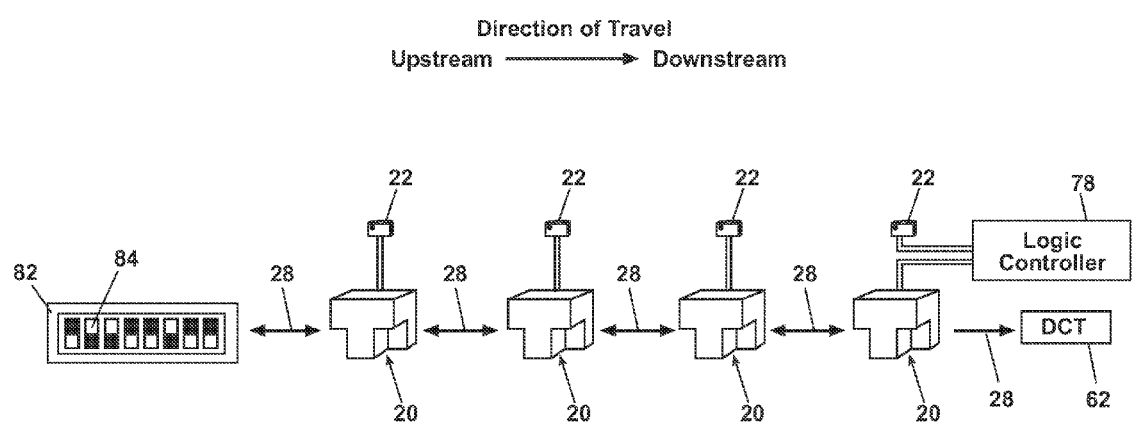
FIG. 6 is a configuration drawing of a second alternative control system for the conveyor system shown in FIG. 1 including a master configuration module having mode-select switches.
Figure 28:
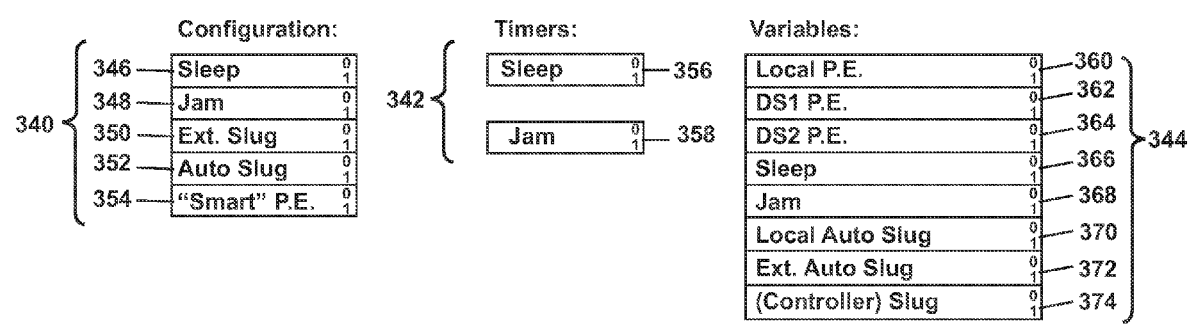
FIG. 28 is a drawing of an organizational arrangement of configurations, timers, and variables for processing by the microprocessor shown in FIG. 3.

The zone control module 20 also comprises a data and memory structure comprising configuration settings 340, timers 342, and variables 344 illustrated by example in FIG. 28. The configuration settings 340 can comprise a sleep setting 346, a jam setting 348, an external slug setting 350, an auto-slug setting 352, and a smart photo-eye setting 354. These settings are comprised of binary data (0, 1) either pre-programmed into the microprocessor or transferred to the microprocessor via the installation computer system 68, a temporarily installed computer 74, or a wireless device (e.g. a PDA) via an infrared port with the use of the interpreter 60. A set of configuration setting switches may also be used to input the desired settings to the microprocessor as shown in FIG. 6 as 82. The timers 342 can comprise a sleep timer 356 and a jam timer 358. The timers operate in a conventional manner and need not be described in great detail beyond the events which trigger the timers' initiation and events triggered by the expiration of the timers. The variables 344 can comprise a local photo-eye register 360, a first downstream photo-eye register 362, a second downstream photo-eye register 364, a sleep register 366, a jam register 368, a local auto-slug register 370, an external auto-slug register 372, and a (controller) slug register 374. These registers preferably comprise simple on-off devices or standard RAM locations for storing "activated-deactivated" or "enabled-disabled" information.

The zone control modules 20 can also be provided with additional timers, including a photo-eye delay timer, and auto-slug delay timer, a sleep timer, and a jam timer. The photo-eye delay timer is initiated when an optical sensor 22 detects the presence of a package. Depending upon whether the optical sensor 22 continues to detect the presence of a package or not before the delay timer expires, the zone control module 20 communicates one or more messages to the upstream and/or downstream zone control modules 20 based upon a collection of event logic elements hereinafter described. The auto-slug delay timer is initiated when a zone control module 20 receives a message from the immediately following downstream zone control module to initiate an auto-slug function. The sleep timer is initiated when the zone control module 20 activates the pneumatic actuator 38, which activates a zone 13. If the zone control module 20 has not received a message from another zone control module, or has not detected the presence of a package, before the expiration of the sleep timer, the zone control module 20 enters sleep mode and deactivates the zone 13. The jam timer is initiated when the zone control module 20 detects the presence of a package and the downstream zone control modules do not detect the presence of packages. If the jam timer expires without a change in this condition, the zone control module 20 communicates a message to upstream zone control modules to prevent the further transfer of packages from upstream.

Figure 5:
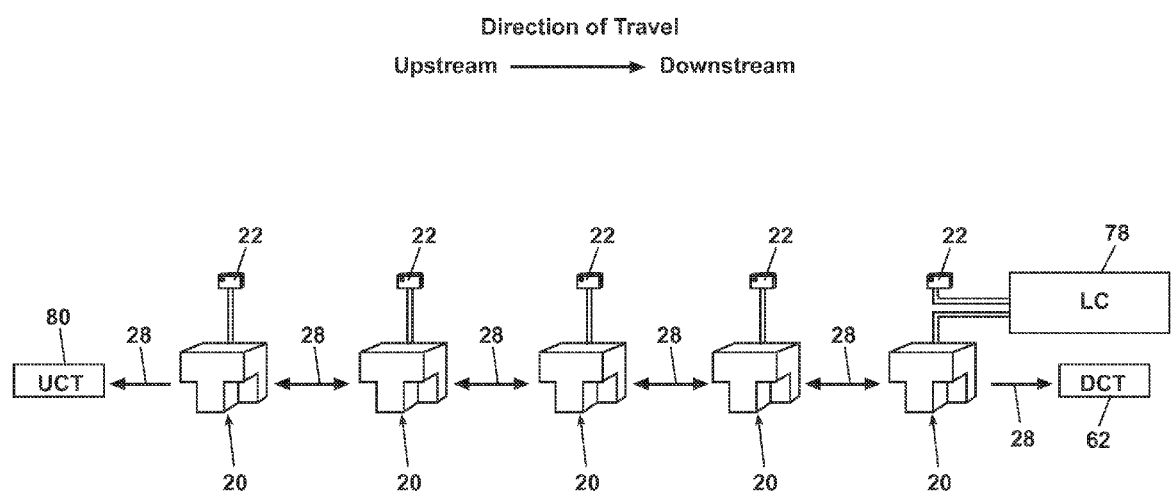
FIG. 5 is a configuration drawing of a first alternative control system for the conveyor system shown in FIG. 1 showing simply a series of interconnected zone control modules according to the invention terminated at upstream and downstream ends by terminators.

The downstream control cable 42 can be terminated in a downstream connector 44. The upstream control cable 46 can be terminated in an upstream connector 48 adapted to connect to the downstream connector 44 of an adjacent zone control module 20, such as through mating male and female connectors, to communicatively connect the zone control modules 20 in series when it no form of the interpreter 60 is used (FIG. 5). The connectors 44, 48 comprise conventional 4-pin connectors.

An optical sensor input 54 on the zone control module 20 is used to electrically interconnect the zone control module 20 with its associated optical sensor 22.

The operational control configuration of the conveyor system 10 can be modified to provide different levels of operational control. Referring to FIG. 4, the zone control modules 20 can be connected in series to terminate at the downstream end of the conveyor system 10 in a downstream cable terminator 62. At the upstream end, the zone control modules 20 terminate in an interpreter module 60, which is adapted to communicate with a wireless personal digital assistant (PDA) 64, or one or more networked computer stations 68 through a field bus 72 connected to a gateway module 66 which is connected to the interpreter module 60 through a field bus 70 using standard network protocols, such as RS-232 or a field bus protocol (as is commonly known in the material handling industry). Alternatively, the interpreter 60 can be connected to a laptop computer 74 using standard network protocols 76, such as RS-232. This system enables selected zone control modules 20 to be individually programmed by the PDA 64, the installation computer stations 68, or the laptop computer 74.

As shown in FIG. 5, an alternate configuration utilizes an upstream cable terminator 80 at the upstream termination of the zone control modules 20, and a logic controller 78 interconnected with the downstream zone control module 20 for controlling the discharge zone as packages leave the zone shown in FIG. 5 to another handling area in the conveyor system. As shown in FIG. 6, in yet another configuration, the upstream cable terminator 80 is replaced with a master configuration module 82 comprising a plurality of mode-select switches 84. Configuration settings on the master configuration module 82 are propagated to the networked zone control modules 20 through a configuration message in the protocol described herein.

Figure 7:
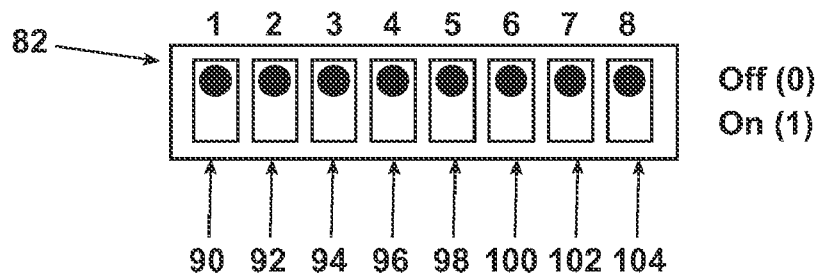
FIG. 7 is a representation of the master configuration module shown in FIG. 6 illustrating the position of the mode-select switches for selected configuration functions.

Referring now to FIG. 7, the master configuration module 82 can comprise a plurality of mode-select switches controlling a selected function. It is to be understood that the master configuration module 82 comprises a portion of the interpreter 60 logic for propagating settings to the zone control modules 20, without departing from the scope of this invention. For example, the first sleep switch 90 and the second sleep switch 92 control four sleep operations. With both switches 90, 92 in the "off" position (up as viewed in FIG. 7), the sleep function will be deactivated. With the first sleep switch 90 in the off position and the second sleep switch 92 in the "on" position, the sleep function will be activated after the expiration of a first interval, such as 2 seconds. With the first sleep switch 90 in the on position and the second sleep switch 92 in the off position, the sleep function will be activated after the expiration of a second interval, such as 5 seconds. Finally, with both switches 90, 92 in the on position, the sleep function will be activated after the expiration of a third interval, such as 8 seconds.

The jam switch 94 controls a hereinafter-described jam detection operation. With the jam switch 94 in the off position, the jam detection function is deactivated. With the jam switch 94 in the on position, the jam detection function is activated. Similarly, the external slug switch 96 controls a hereinafter-described external slug operation. With the external slug switch 96 in the off position, the external slug function is deactivated. Conversely, with the external slug switch 96 in the on position, the external slug function is activated. Finally, the auto-slug switch 98 controls a hereinafter described auto-slug operation. With the auto-slug switch 98 in the off position, the auto-slug function will be deactivated. With the auto-slug switch 98 in the on position, the auto-slug function will be activated. Activating a switch in the master configuration module 82 sets all zone control module 20 to perform the same function. The jam, external slug, and auto-slug functions will be further described herein with respect to FIGS. 9-28.

Figure 8:
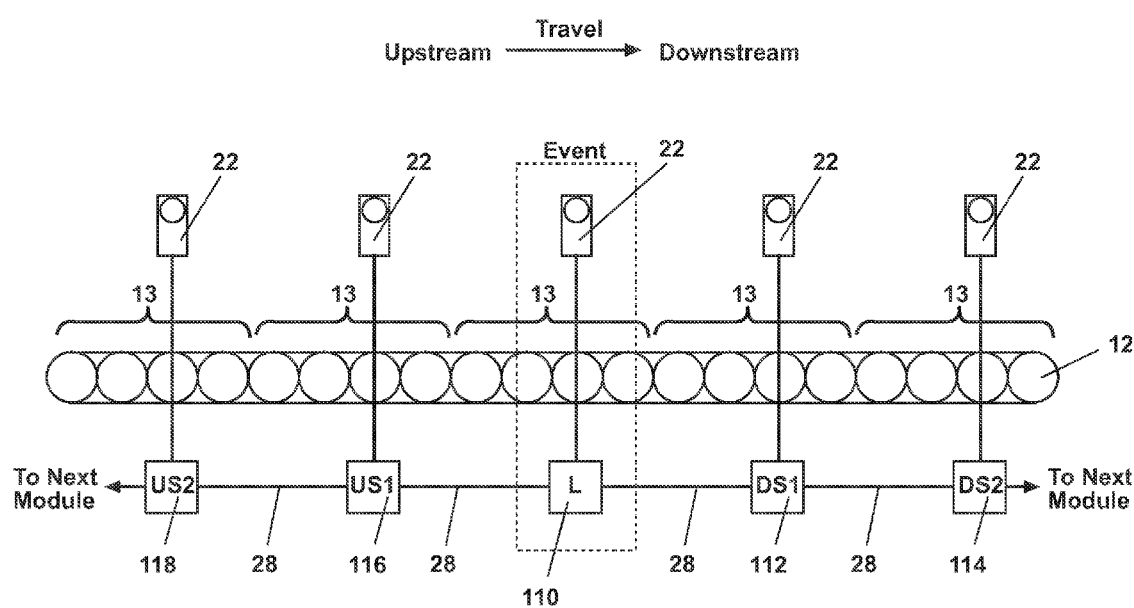
FIG. 8 is a drawing of a portion of the conveyor system shown in FIG. 1 illustrating an identification convention for a series of interconnected zone control modules according to the invention.

FIG. 8 is a drawing depicting a portion of the conveyor system 10 comprising rollers 12 organized into zones 13 controlled by associated zone control modules 20 and optical sensors 22. Five zone control modules 20 are shown interconnected as previously described. However, it should be understood that the typical conveyor system 10 will comprise a plurality of zones 13, corresponding zone control modules 20, and optical sensors 22. Nevertheless, the logic for the conveyor control system is structured around an exemplary plurality of zone control modules, or "neighborhood," comprising five zone control modules 20 comprising a local zone control module 110, a first downstream zone control module 112 (DS1), a second downstream zone control module 114 (DS2), a first upstream zone control module 116 (US1), and a second upstream zone control module 118 (US2). The five zone control modules 110-118 communicate with each other through the control cables 28 as packages travel along the conveyor system 10.

Figure 8A:
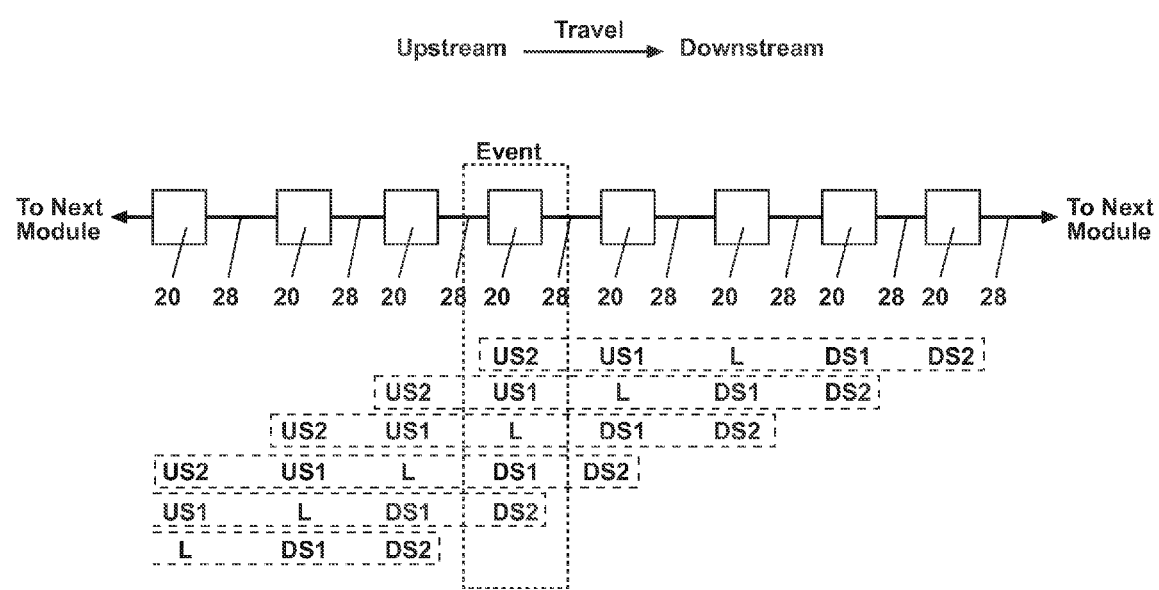

As shown in FIG. 8A, each zone control module 20 is a local zone control module 110 within a neighborhood of five zone control modules. Each zone control module 110 processes one or more of the event logic elements according to a collection of event logic elements shown in FIG. 9 and described hereinafter. With respect to an event logic element being processed by a particular zone control module 110, referred to as the "local" zone control module (L), the two immediately downstream zone control modules 20 and the two immediately upstream zone control modules 20 comprise a particular zone control module's "neighborhood," and are identified as the first downstream zone control module 112 (DS1), the second downstream zone control module 114 (DS2), the first upstream zone control module 116 (US1), and the second upstream zone control module 118 (US2). However, each of the two downstream zone control modules 112 (DS1), 114 (DS2) and the two upstream zone control modules 116 (US1), 118 (US2) is also a local zone control module 110 with respect to an event logic element being processed by that zone control module, with its own neighborhood of downstream and upstream zone control modules 112-118. Thus, as shown in FIGS. 8 and 8A, a particular zone control module 20 can simultaneously comprise a local zone control module 110 (L), a first downstream zone control module 112 (DS1), a second downstream zone control module 114 (DS2), a first upstream zone control module 116 (US1), and a second upstream zone control module 118 (US2) as determined by its processing of an event logic element, or the processing of an event logic element by either of the two downstream zone control modules 112 (DS1), 114 (DS2) or the two upstream zone control modules 116 (US1), 118 (US2).

For convenience, the optical sensor 22 associated with a specific zone control module 20 will be referred to by the designation of that zone control module. For example, the optical sensor 22 associated with a local zone control module 110 will be referred to as the local optical sensor or photo-eye, and the optical sensor 22 associated with the second downstream zone control module 114 (DS2) will be referred to as the second downstream optical sensor or photo-eye.

The conveyor system 10 can operate in one of several modes, referred to herein as accumulation, slug, auto-slug, jam, and sleep modes. Other modes are conceivable to those skilled in the operation of conveyors and are technically feasible in the embodiment of this invention.

In accumulation mode, the local zone control valve is activated if the DS1 photo-eye indicates that the DS1 zone is "clear." Conversely, the local zone control valve is deactivated if the DS1 photo-eye indicates that the DS1 zone is "not cleared."

In slug mode, all zones 13 are activated to transfer packages along the conveyor regardless of inputs from the photo-eye 22 (typically used to rapidly advance one or more objects along a conveyor system having a length of unoccupied space).

In auto-slug mode, a zone control module 20 which is configured to accept or generate an auto-slug signal will turn a local zone control valve on, thereby activating the zone 13 associated with the local zone control valve, when the local zone control module generates its own auto-slug signal or receives an auto-slug signal from a downstream zone control module.

Jam detection mode responds to the condition that occurs when a package is unable to travel down the conveyor system 10, such as when packages are jammed in such a way as to prevent their further movement. In such a condition, the photo-eye associated with a local zone control module signals the presence of a package, the downstream photo-eyes fail to detect a package, and the local zone control valve remains in an activated state after a predetermined amount of time has expired, referred to as the jam timer. If the jam timer expires, the local zone control valve is left activated to possibly "clear" the jam condition, and the local zone control module passes a "jam on" signal to the first upstream zone control module, disabling any previously enabled slug or auto-slug condition, thereby stopping additional packages from traveling down the conveyor into the jammed zone. Normal conveyor operation resumes when the local photo-eye no longer detects the presence of a package.

Figure 15:
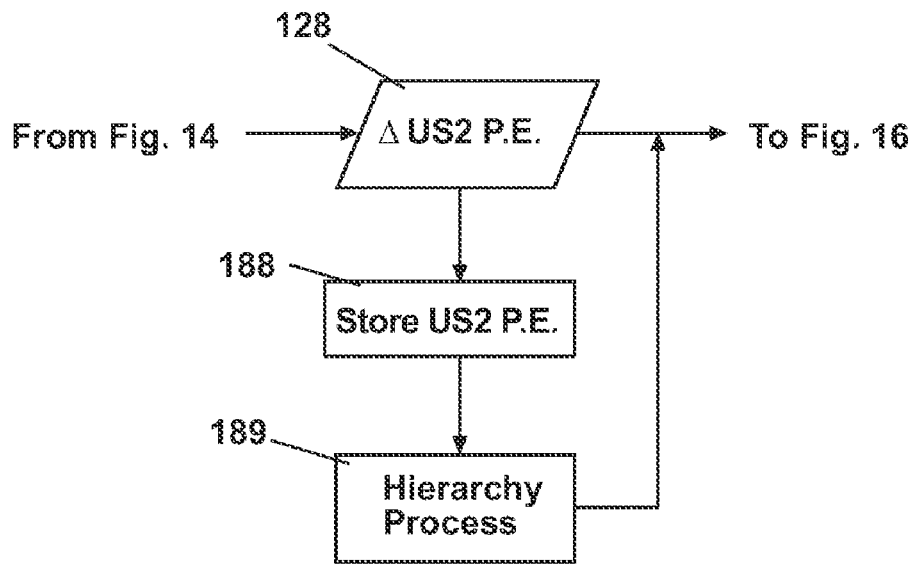
FIG. 15 is a flow chart drawing of a sixth event logic element of the microprocessor-based collection of event logic elements shown in FIG. 9 for evaluating a second upstream photo-eye event.
Figure 27A:
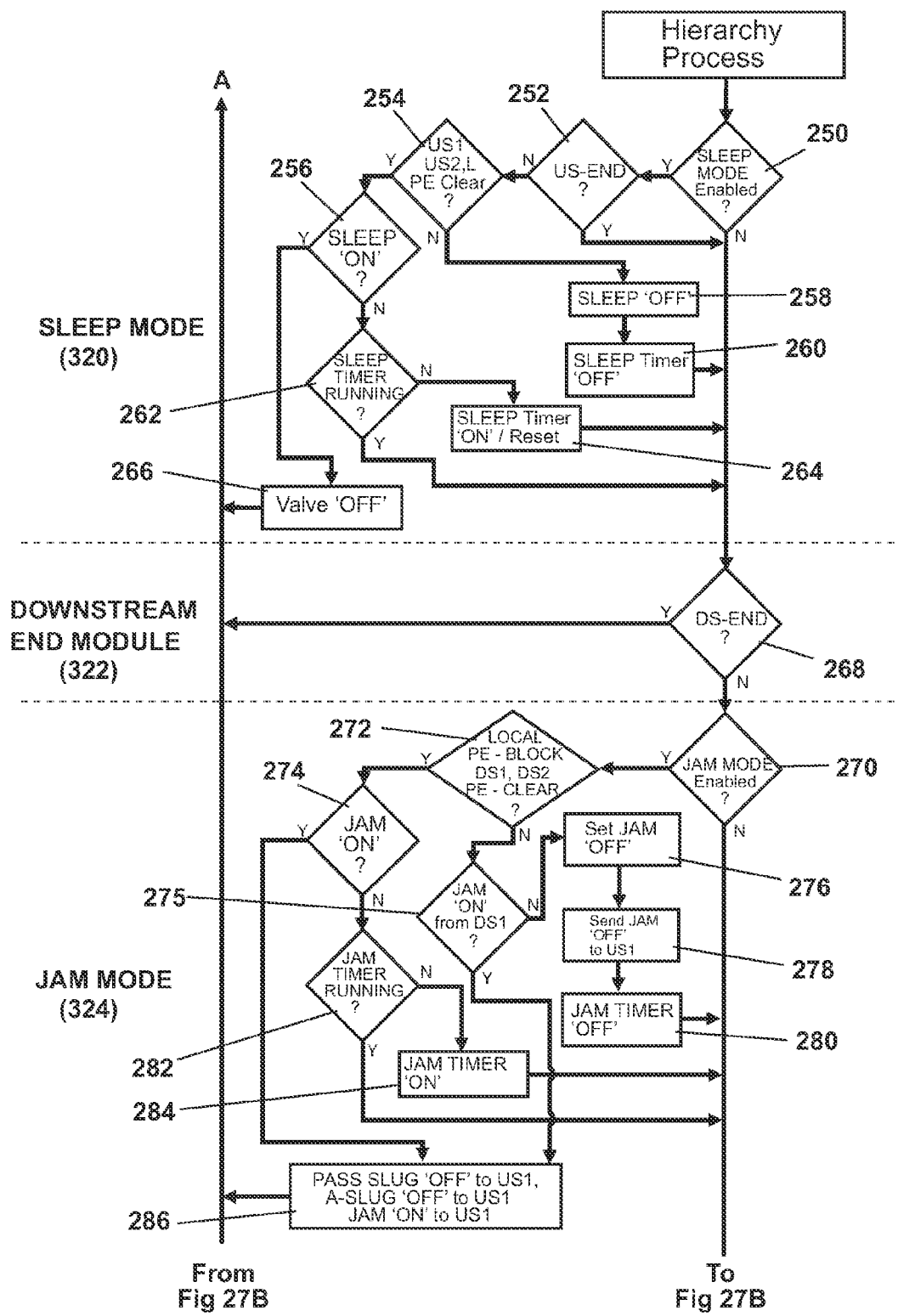
FIG. 27A is a flow chart of a first portion of a hierarchy logic process of the microprocessor-based collection of event logic elements shown in FIG. 9.

In sleep mode, the zone control module deactivates the local zone control valve after a predetermined amount of time has expired (sleep timer), during which the local photo-eye 110 and its associated upstream photo-eyes (US1, US2) 116, 118 are "cleared." The local zone control valve remains deactivated until a change in photo-eye status is received by the local zone control module 110 (L) from the second upstream zone control module 118 (US2), triggering the performance of the hierarchy process, consistent with the event logic element 128 shown in FIG. 15, and causing the local zone control module 110 (L) to "wake up" pursuant to hierarchy process steps 258 and 260 shown in FIG. 27A. A "wake-up" signal is also generated pursuant to the hierarchy process steps 258, 260 if a package is placed in the path of a local photo-eye 110.

Figure 9:
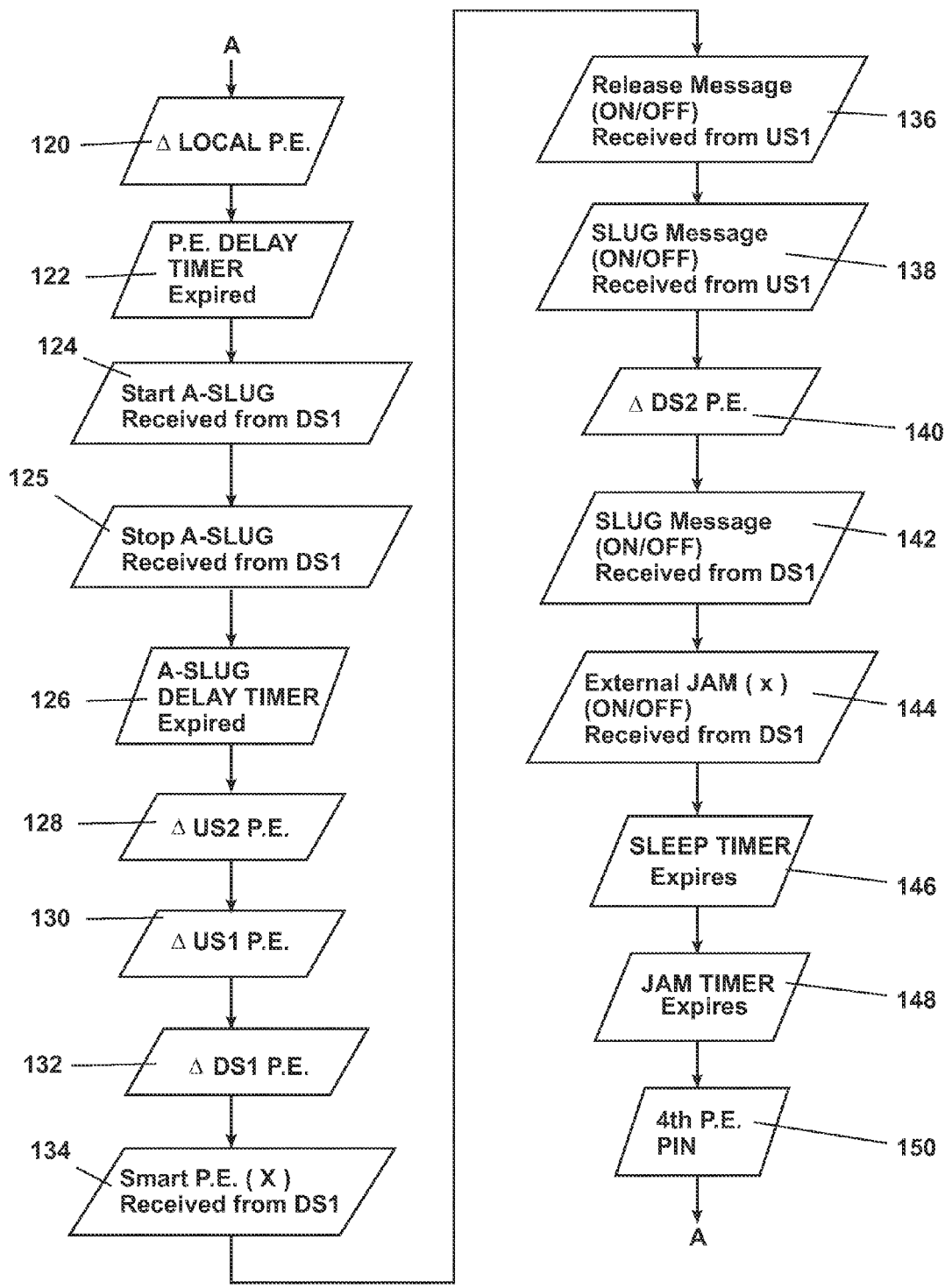
FIG. 9 is a flow chart drawing of a portion of a microprocessor-based collection of event logic elements for evaluating information received by a zone control module in the system shown in FIG. 1.

FIG. 9 illustrates a collection of event logic elements which each zone control module 20 performs whenever it undergoes an event, such as a signal from the photo-eye, or a signal from an upstream or downstream zone control module. Each event initiates the performance of event logic elements associated with that event.

For example, an event may comprise a change in the local photo-eye condition, identified in FIG. 9 as the event 120, or the expiration of a delay timer, identified in FIG. 9 as the event 126. An event may also comprise the receipt of a signal from a remote zone control module correlating to a change in the photo-eye condition associated with that zone control module, such as a change in the photo-eye condition of the first upstream zone control module, identified in FIG. 9 as the event 130. Each of these events initiates the performance of event logic elements which are illustrated in FIGS. 10-26. The event logic elements associated with events 120, 122, 124, 126, 128, 130, 132, 140, 142, 144, 146, 148, and 150 can further initiate the performance of a hierarchy process, shown in FIGS. 27A and 27B. For purposes of description, the numbering of the event logic elements corresponds with the numbering of the events in FIG. 9 as shown below in Table 2.

TABLE 2

| EVENT | FUNCTION | REFERENCE NO. | FIG. NO. |
|---|---|---|---|
| Local P.E. | Process local photo-eye event | 120 | 10 |
| P.E. DELAY TIMER expired | Process photo-eye delay timer event | 122 | 11 |
| Start A-SLUG received from DS1 | Process auto-slug initiation event | 124 | 12 |
| Stop A-SLUG received from DS1 | Process auto-slug termination event | 125 | 13 |
| A-SLUG DELAY TIMER expired | Process auto-slug delay timer event | 126 | 14 |
| Δ US2 P.E. | Process second upstream photo-eye status change event | 128 | 15 |
| Δ US1 P.E. | Process first upstream photo-eye status change event | 130 | 16 |
| Δ DS1 P.E. | Process first downstream photo-eye status change event | 132 | 17 |
| Smart P.E. (x) received from DS1 | Process smart photo-eye event | 134 | 18 |
| Release message (ON/OFF) received from US1 | Process release message event | 136 | 19 |
| SLUG message (ON/OFF) received from US1 | Process upstream slug message event | 138 | 20 |
| Δ DS2 P.E. | Process second downstream photo-eye status change event | 140 | 21 |
| SLUG message (ON/OFF) received from DS1 | Process downstream slug message event | 142 | 22 |
| External JAM (x) (ON/OFF) received from DS1 | Process external jam event | 144 | 23 |
| SLEEP TIMER expires | Process sleep timer event | 146 | 24 |
| JAM TIMER expires | Process jam timer event | 148 | 25 |
| 4th P.E. PIN | Process fourth photo-eye pin event | 150 | 26 |

Figure 10:
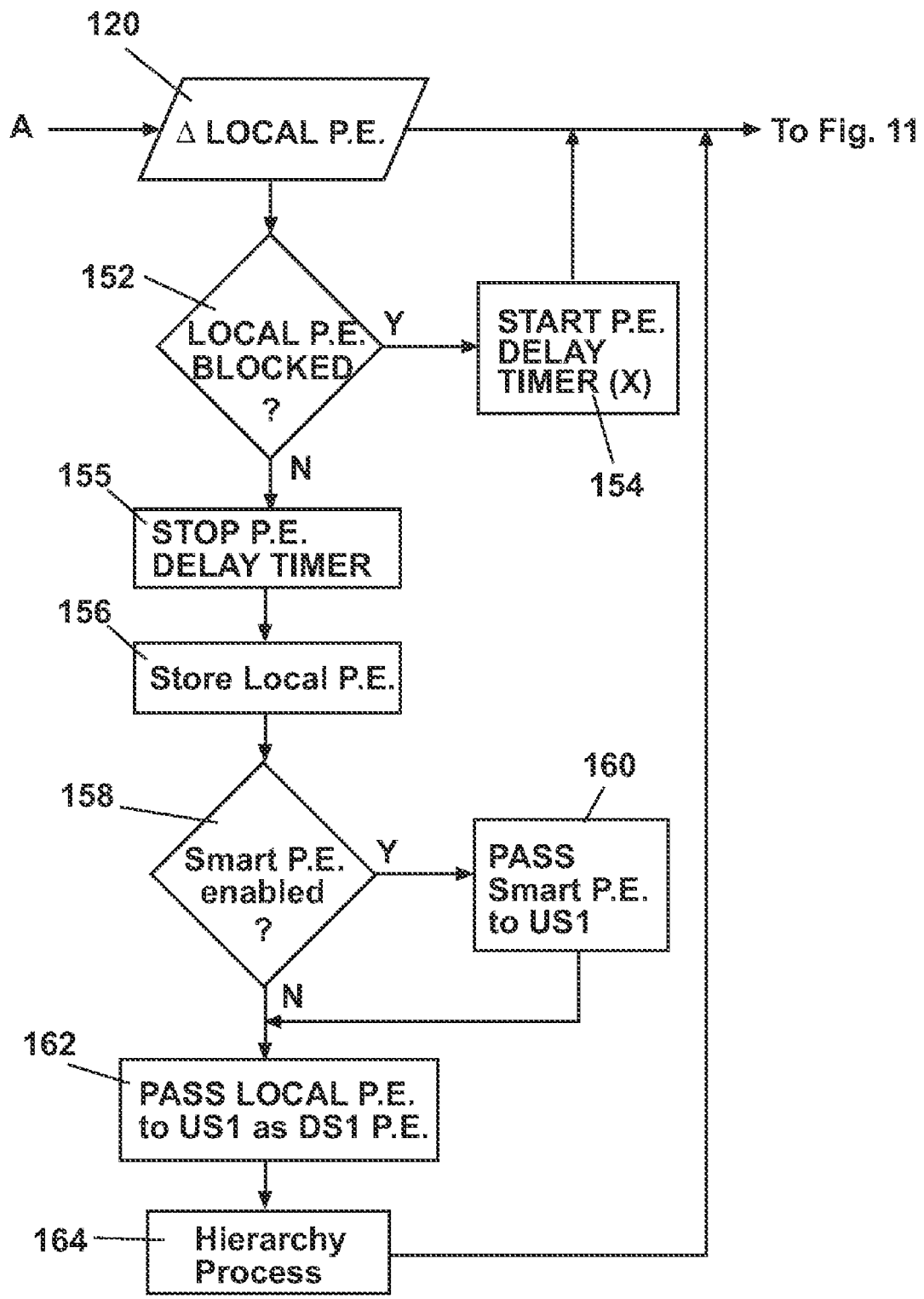
FIG. 10 is a flow chart drawing of a first event logic element of the microprocessor-based collection of event logic elements shown in FIG. 9 for evaluating a local photo-eye event.

Referring now to FIGS. 9 and 10, the first event logic element 120 evaluates the status of the local photo-eye associated with the local zone control module 110 (i.e. the zone control module responding to an event). The event logic element 120 first evaluates whether the local photo-eye is blocked (decision node 152) by a package. If it is, a photo-eye delay timer is started (step 154), the event logic element terminates, and the next event (event 122 in this example) is evaluated. A slight delay in the recognition of a blocked local photo-eye accomplishes two functions: 1) it increases the efficiency of the system by decreasing the gap between packages, and 2) it decreases the number of cycles of the local zone control module valve, thereby increasing the longevity of the entire system. If the photo-eye is not blocked, the photo-eye delay timer is stopped (step 155), and the local photo-eye condition, i.e. unblocked (0) or blocked (1), is stored in the zone control module's memory (local photo-eye register 360) (step 156) in order to serve as a baseline for comparison of future photo-eye conditions. The event logic element then evaluates whether the smart photo-eye function is enabled (decision node 158) for the local photo-eye in order to control the flow of information from the local photo-eye back to the PDA 64, the networked computer stations 68, or the laptop computer 74. If it is, that information is transmitted to the first upstream zone control module 116 (US1) (step 160) as a unique photo-eye location (x) with photo-eye status to be propagated upstream to the interpreter 60. Additionally, the local photo-eye status is transmitted to the first upstream zone control module 116 (US1) as information from a first downstream photo-eye (DS1) (step 162). If it is not, the local photo-eye status is transmitted solely to the first upstream zone control module 116 (US1) as information from a first downstream photo-eye (DS1) (step 162). The event logic element terminates with the performance of a hierarchy process (step 164), described hereinafter, which determines whether the actuator 38 will be activated or deactivated based on the configuration hierarchy of the system. After the performance of the hierarchy process in FIGS. 27A-B, the next event (event logic element 122) in the collection of event logic elements is evaluated.

Figure 11:
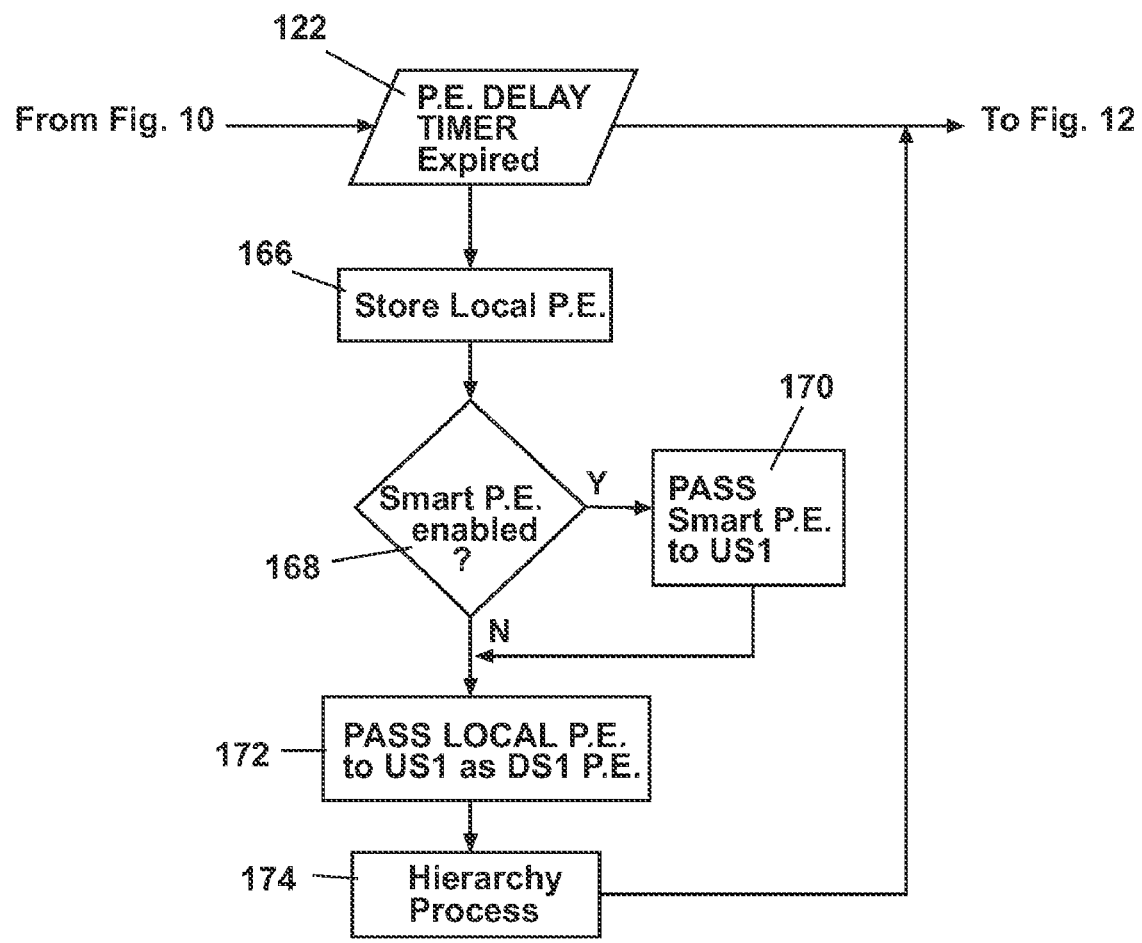
FIG. 11 is a flow chart drawing of a second event logic element of the microprocessor-based collection of event logic elements shown in FIG. 9 for evaluating a photo-eye delay timer event.

Referring now to FIGS. 9 and 11, the second event logic element 122 evaluates whether the photo-eye delay timer has expired. The expiration of the photo-eye delay timer indicates that a package has been conveyed into the local zone for a preselected length of time, to be treated as a blocked photo-eye condition. This condition is conveyed upstream in order to control the conveying of packages to the subject zone. The local photo-eye status is first stored in memory (local photo-eye register 360) (step 166) in order to serve as a baseline for comparison of future photo-eye conditions, and the event logic element evaluates whether the smart photo-eye function is enabled as indicated by the smart photo-eye setting 354 (decision node 168) for possible propagation upstream to the interpreter 60 in order to control the flow of information from the local photo-eye back to the PDA 64, the networked computer stations 68, or the laptop computer 74. If it is, that information is transmitted to the first upstream zone control module 116 (US1) as a message in the protocol described herein (step 170), and the local photo-eye status is transmitted to the first upstream zone control module 116 (US1) as information from a first downstream photo-eye (DS1) (step 172). If it is not, the local photo-eye status is transmitted to the first upstream zone control module 116 (US1) as information from a first downstream photo-eye (DS1) (step 172). The event logic element terminates with the performance of a hierarchy process (step 174), described hereinafter. After the performance of the hierarchy process, the next event (event logic element 124) in the collection of event logic elements is evaluated.

Figure 12:
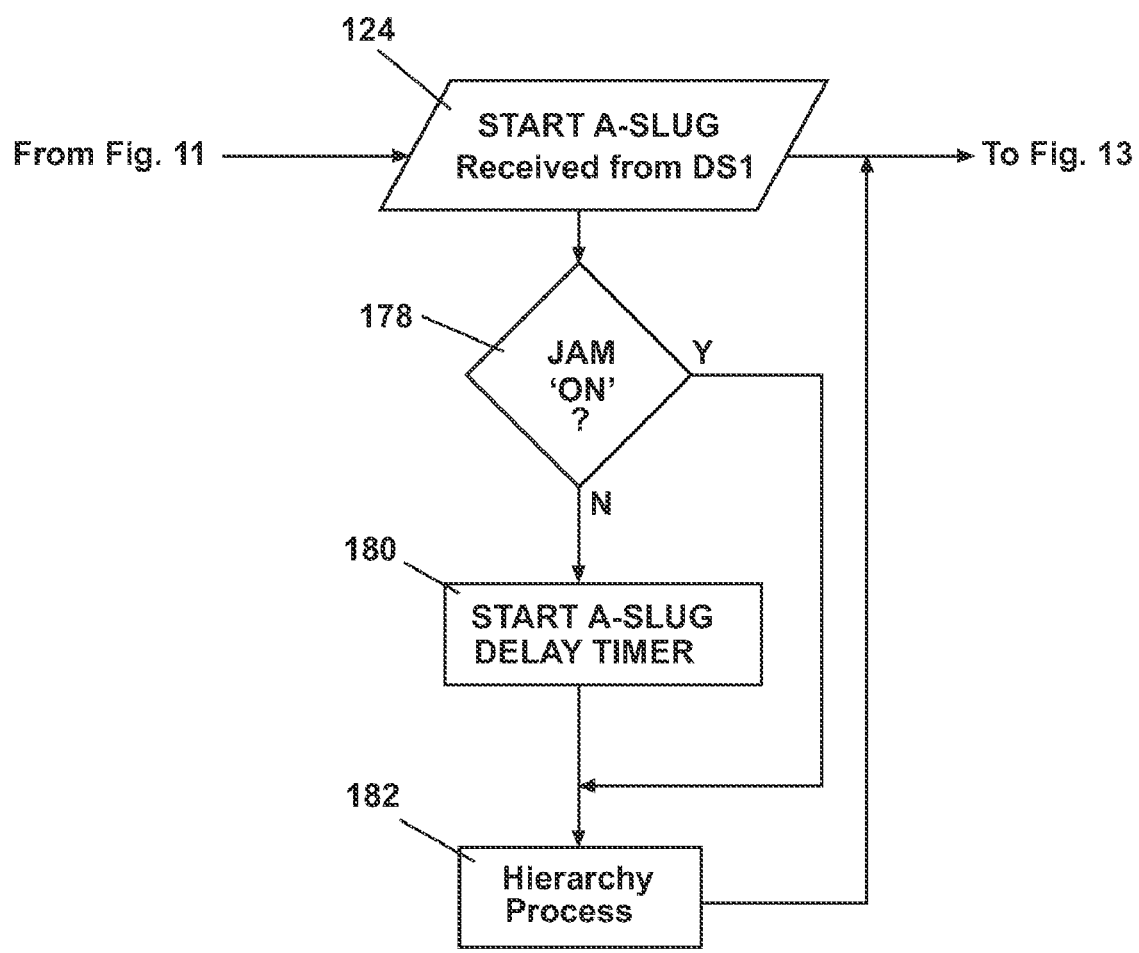
FIG. 12 is a flow chart drawing of a third event logic element of the microprocessor-based collection of event logic elements shown in FIG. 9 for evaluating an auto-slug initiation event.

Referring now to FIGS. 9 and 12, the third event logic element 124 evaluates a message received from the first downstream zone control module 112 (DS1) to initiate an auto-slug condition. This message will have been generated by the auto-slug mode process 328 of the hierarchy process wherein a start auto-slug message is transmitted to the first upstream zone control module 116 (US1) (step 310). The event logic element 124 evaluates whether a jam condition exists (decision node 178). If it does, the auto-slug message cannot be propagated further upstream and corrective measures must be undertaken. Thus, continuance of the hierarchy process (step 182) is initiated. If a jam condition does not exist, the auto-slug delay timer is initiated (step 180) followed by performance of the hierarchy process (step 182). The auto-slug delay timer allows for a certain amount of time before the "start auto-slug" message is transmitted upstream to ensure that the system is stable, and that a countervailing message or condition does not exist that would militate against an auto-slug condition. After performance of the hierarchy process, the next event (event logic element 125) in the collection of event logic elements is evaluated.

Figure 13:
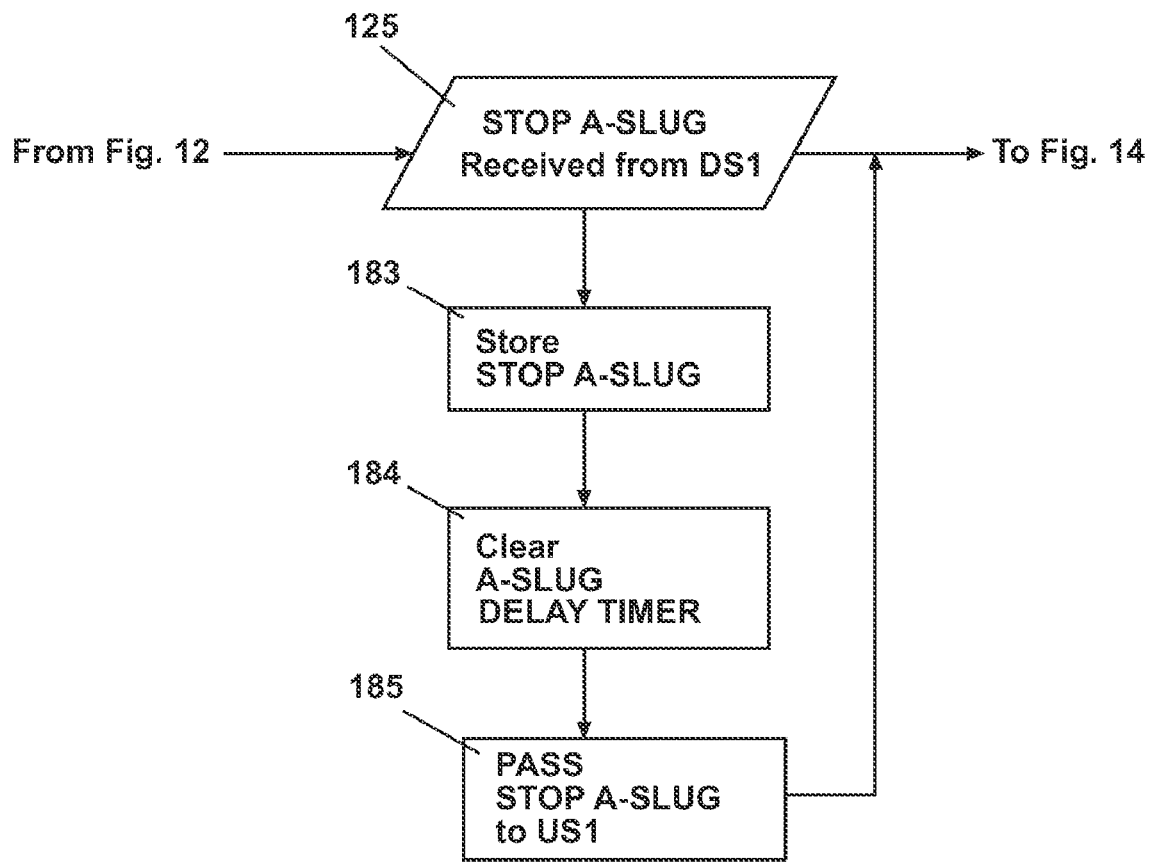
FIG. 13 is a flow chart drawing of a fourth event logic element of the microprocessor-based collection of event logic elements shown in FIG. 9 for evaluating an auto-slug termination event.

Referring now to FIGS. 9 and 13, the fourth event logic element 125 evaluates a message received from the first downstream zone control module 112 (DS1) to terminate an auto-slug condition. The message to terminate the auto-slug condition is first stored in memory as indicated by the auto-slug setting 352 (step 183), and the auto-slug delay timer is cleared (step 184). The local zone control module 110 then delivers a message to terminate the auto-slug condition to the first upstream zone control module 116 (US1) (step 185) for further propagation upstream. This step is followed by evaluation of the next event (event logic element 126) in the collection of event logic elements.

Figure 14:
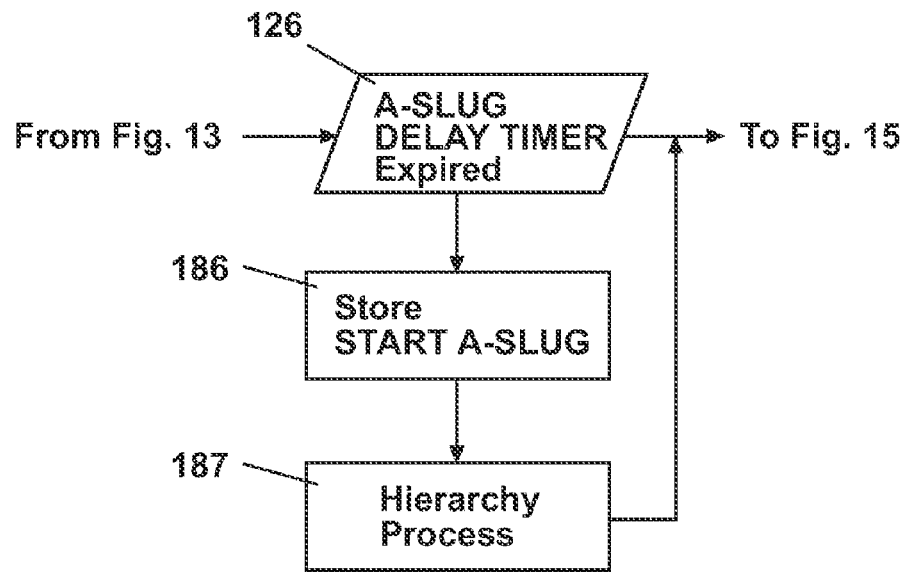
FIG. 14 is a flow chart drawing of a fifth event logic element of the microprocessor-based collection of event logic elements shown in FIG. 9 for evaluating an auto-slug delay timer event.

Referring now to FIGS. 9 and 14, the fifth event logic element 126 is initiated when the auto-slug delay timer has expired, indicating that it is "safe" to enter an auto-slug condition and to propagate the "start auto-slug" message upstream. When this event occurs, the local zone control module 110 stores a command to start the auto-slug function (local auto-slug register 370) (step 186), followed by performance of the hierarchy process (step 187). The next event (event logic element 128) in the collection of event logic elements is then evaluated.

Referring to FIGS. 9 and 15, the sixth event logic element 128 is initiated when a change in the photo-eye status of the second upstream photo-eye 118 (US2) is transmitted to the local zone control module 110. This event is relevant to the sleep mode process 320 of the hierarchy process in which the status of the second upstream photo-eye 118 (US2) is evaluated (step 254). The local zone control module 110 stores the status of the second upstream photo-eye 118 (US2) (step 188) in order to serve as a baseline for comparison of future photo-eye conditions, followed by performance of the hierarchy process (step 189). After the performance of the hierarchy process, the next event (event logic element 130) in the collection of event logic elements is evaluated.

Figure 16:
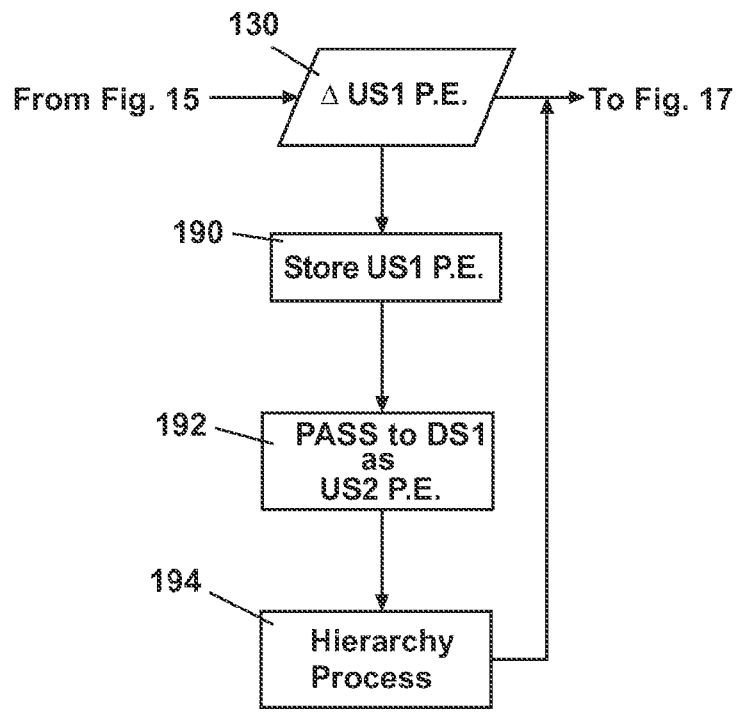
FIG. 16 is a flow chart drawing of a seventh event logic element of the microprocessor-based collection of event logic elements shown in FIG. 9 for evaluating a first upstream photo-eye event.

Referring now to FIGS. 9 and 16, the seventh event logic element 130 is initiated when a change in the photo-eye status of the first upstream photo-eye 116 (US1) is transmitted to the local zone control module 110. This event is relevant to the sleep mode process 320 of the hierarchy process in which the status of the first upstream photo-eye 116 (US1) is evaluated (step 254). The local zone control module 110 stores the status of the first upstream photo-eye 116 US1 (step 190) in order to serve as a baseline for comparison of future photo-eye conditions, passes this information to the first downstream zone control module 112 (DS1) as photo-eye information from the second upstream zone control module US2 (step 192) (thereby initiating the event logic element 128 as to the first downstream zone control module 112 (DS1)), followed by performance of the hierarchy process (step 194). After the performance of the hierarchy process, the next event (event logic element 132) in the collection of event logic elements is evaluated.

Figure 17:
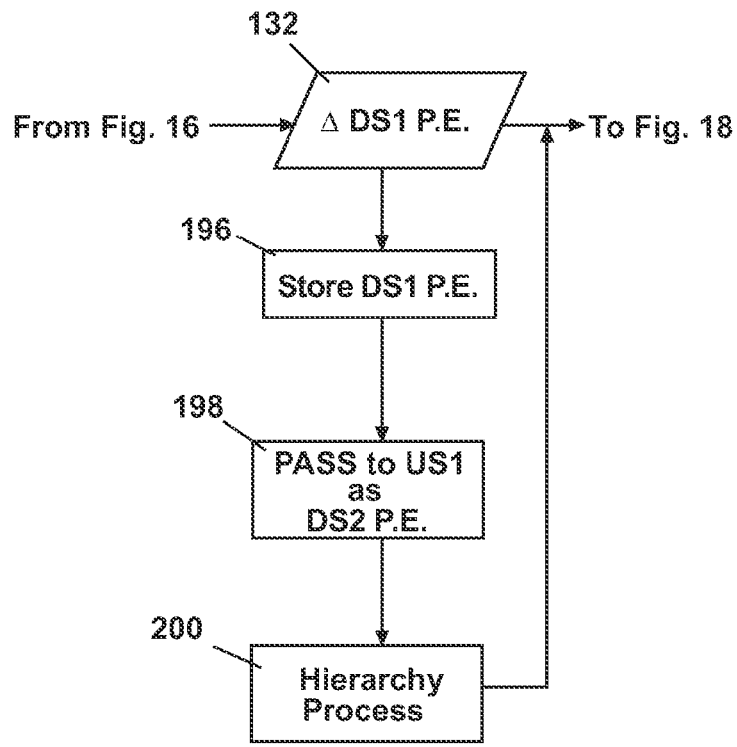
FIG. 17 is a flow chart drawing of an eighth event logic element of the microprocessor-based collection of event logic elements shown in FIG. 9 for evaluating a first downstream photo-eye event.

Referring now to FIGS. 9 and 17, the eighth event logic element 132 is initiated when the local zone control module 110 receives a message concerning a change in the photo-eye status of the first downstream photo-eye 112 (DS1). This event is relevant to the jam mode process 324, the auto-slug mode process 328, and the valve operation process 330, wherein the status of the first downstream photo-eye 112 (DS1) is evaluated (steps 272, 300, and 314, respectively). The local zone control module 110 stores the information regarding the status of the first downstream photo-eye 112 (DS1) (first downstream photo-eye register 362) (step 196) in order to serve as a baseline for comparison of future photo-eye conditions, transmits this information to the first upstream zone control module 116 (US1) as information from the second downstream photo-eye (step 198) (thereby initiating the event logic element 140 as to the first upstream zone control module 116 (US1)), followed by performance of the hierarchy process (step 200). After the performance of the hierarchy process, the next event (event logic element 134) in the collection of event logic elements is evaluated.

Figure 18:
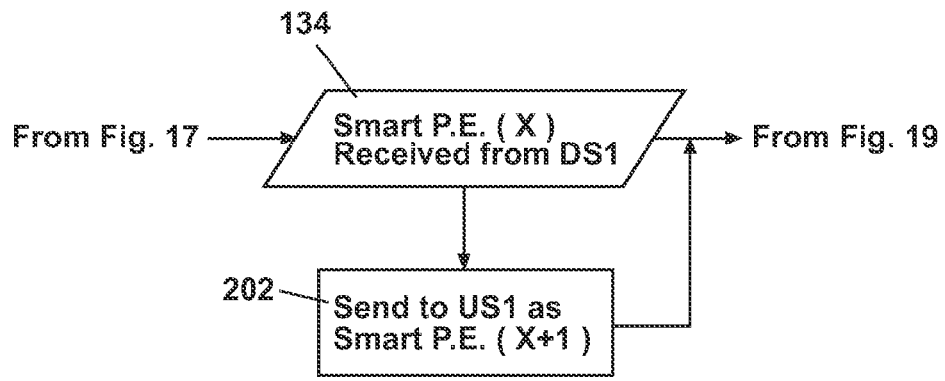
FIG. 18 is a flow chart drawing of a ninth event logic element of the microprocessor-based collection of event logic elements shown in FIG. 9 for evaluating a smart photo-eye event.

Referring now to FIGS. 9 and 18, the ninth event logic element 134 is initiated when the local zone control module 110 receives a smart photo-eye signal from the first downstream zone control module 112 (DS1) for propagation upstream to the interpreter 60. The local zone control module 110 transmits this information to the first upstream zone control module 116 (US1) (step 202), followed by evaluation of the next event (event logic element 136) in the collection of event logic elements.

Figure 19:
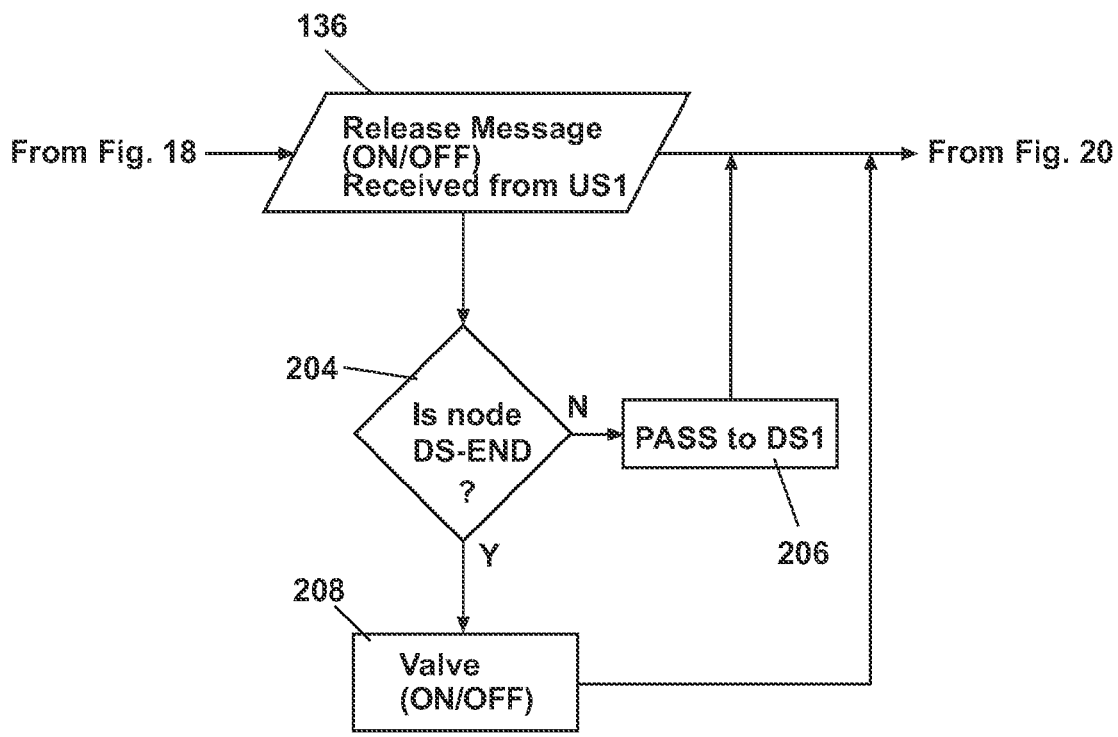
FIG. 19 is a flow chart drawing of a tenth event logic element of the microprocessor-based collection of event logic elements shown in FIG. 9 for evaluating a release message event.

Referring to FIGS. 9 and 19, the tenth event logic element 136 is initiated when a release message is received from the first upstream zone control module 116 (US1). This message will indicate whether the local zone control module 110 should activate its zone 13 in order to release packages off the conveyor, or should deactivate its zone 13 in order to prevent the transfer of packages downstream. The event logic element first evaluates whether the local zone control module 110 is at the downstream end of the conveyor system 10 (decision node 204). If the local zone control module 110 is at the downstream end of the conveyor system 10, its pneumatic valve is activated or deactivated (step 208) based on an input from the installation computer system 68, followed by evaluation of the next event in the collection of event logic elements. If it is not, the release message is transmitted to the first downstream zone control module 112 (DS1) (step 206) in search of the downstream end local zone control module, followed by evaluation of the next event (event logic element 138) in the collection of event logic elements.

Figure 20:
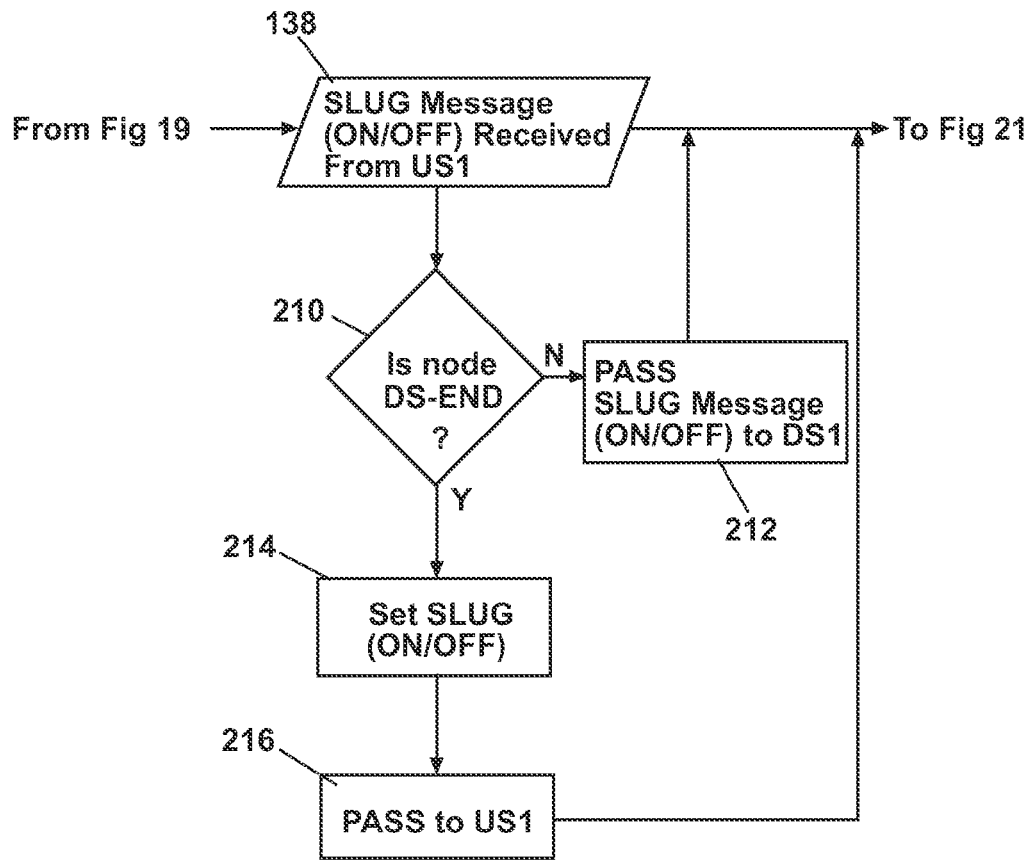
FIG. 20 is a flow chart drawing of an eleventh event logic element of the microprocessor-based collection of event logic elements shown in FIG. 9 for evaluating an upstream slug message event.

Referring now to FIGS. 9 and 20, the eleventh event logic element 138 is initiated when the local zone control module 110 receives a slug message from the first upstream zone control module 116 (US1). This message will indicate whether the local zone control module 110 should activate or deactivate a slug condition. The event logic element first evaluates whether the local zone control module 110 is at the downstream end of the conveyor system 10 (decision node 210). If it is not, the slug message is transmitted to the first downstream zone control module (step 212), followed by evaluation of the next event (event logic element 140) in the collection of event logic elements. If the local zone control module 110 is at the downstream end of the conveyor system 10, the local zone control module activates/deactivates its slug mode (step 214) based on an input from the installation computer system 68, and transmits this information to the first upstream zone control module 116 (US1) (step 216) for further propagation back upstream. This is followed by evaluation of the next event (event logic element 140) in the collection of event logic elements.

Figure 21:
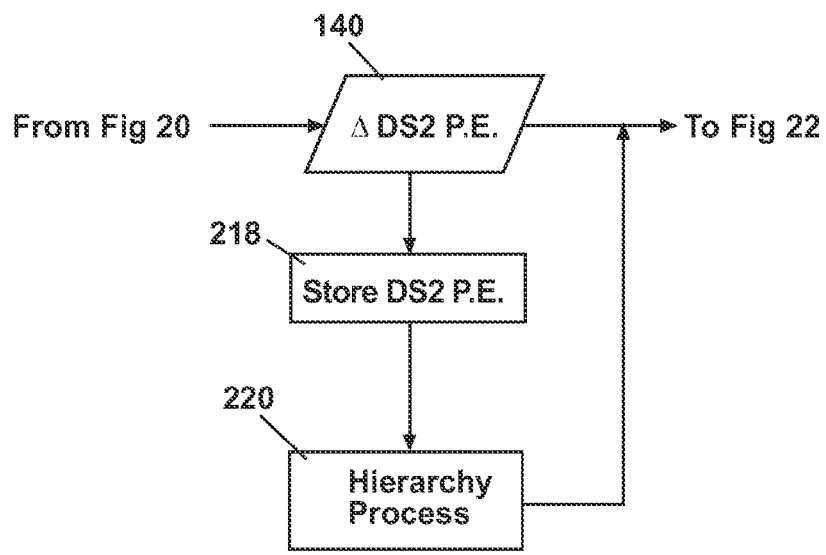
FIG. 21 is a flow chart drawing of a twelfth event logic element of the microprocessor-based collection of event logic elements shown in FIG. 9 for evaluating a second downstream photo-eye event.

Referring now to FIGS. 9 and 21, the twelfth event logic element 140 is initiated when the local zone control module 110 receives status information from the second downstream zone control module 114 (DS2) concerning the photo-eye associated with that module. This event is relevant to the jam mode process 324, and the auto-slug mode process 328, wherein the status of the second downstream photo-eye 114 (DS2) is evaluated (steps 272 and 300, respectively). The local zone control module 110 stores the information received (second downstream photo-eye register 364) (step 218) in order to serve as a baseline for comparison of future photo-eye conditions, followed by performance of the hierarchy process (step 220). This is followed by evaluation of the next event (event logic element 142) in the collection of event logic elements.

Figure 22:
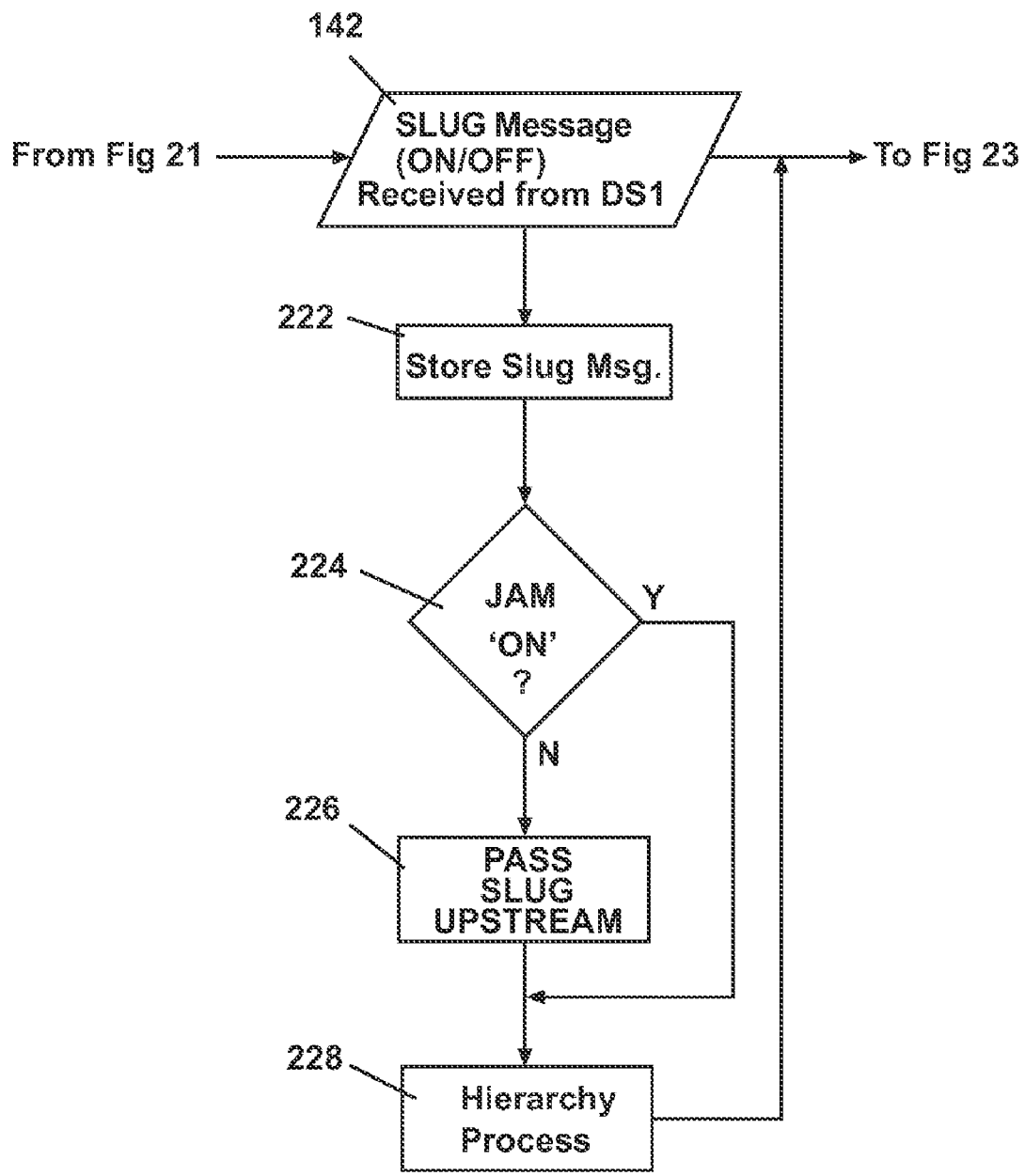
FIG. 22 is a flow chart drawing of a thirteenth event logic element of the microprocessor-based collection of event logic elements shown in FIG. 9 for evaluating a downstream slug message event.

Referring now to FIGS. 9 and 22, the thirteenth event logic element 142 is initiated when the local zone control module 110 receives a slug message from the first downstream zone control module 112 (DS1). This message will indicate whether the local zone control module 110 should activate or deactivate a slug condition. The local zone control module 110 first stores the received information (step 222), and then evaluates whether a jam condition exists (decision node 224), since a slug condition must not be initiated if a jam exists. If a jam exists, the hierarchy process is performed (step 228), followed by evaluation of the next event (event logic element 144) in the collection of event logic elements. If a jam does not exist, the slug message is passed upstream (step 226), and the hierarchy process is performed (step 228), followed by evaluation of the next event (event logic element 144) in the collection of event logic elements.

Figure 23:
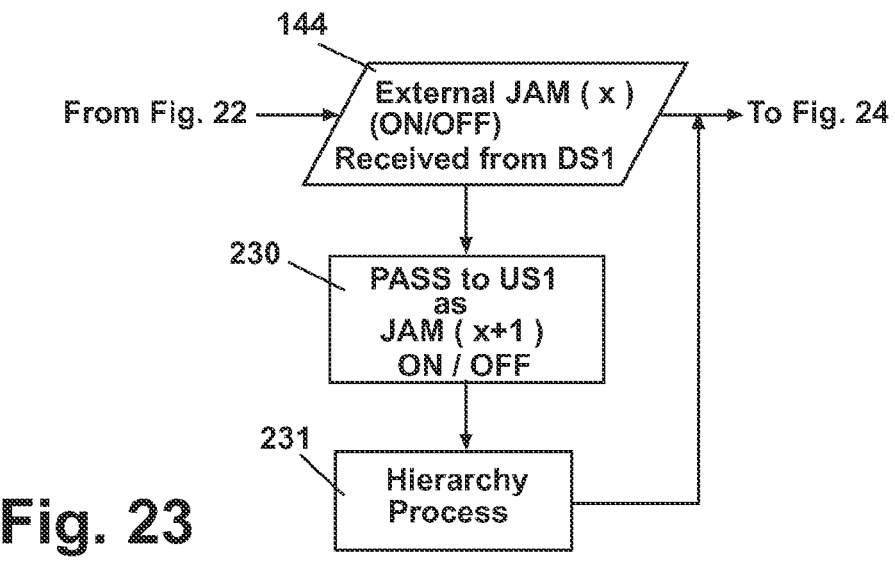
FIG. 23 is a flow chart drawing of a fourteenth event logic element of the microprocessor-based collection of event logic elements shown in FIG. 9 for evaluating an external jam event.

Referring now to FIGS. 9 and 23, the fourteenth event logic element 144 is initiated when the local zone control module 110 receives an external jam message from the first downstream zone control module 112 (DS1) indicating that a jam condition exists downstream at "x." The local zone control module 110 transmits the jam message to the first upstream zone control module 116 (US1) (step 230), followed by performance of the hierarchy process (step 231), and evaluation of the next event (event logic element 146).

Figure 24:
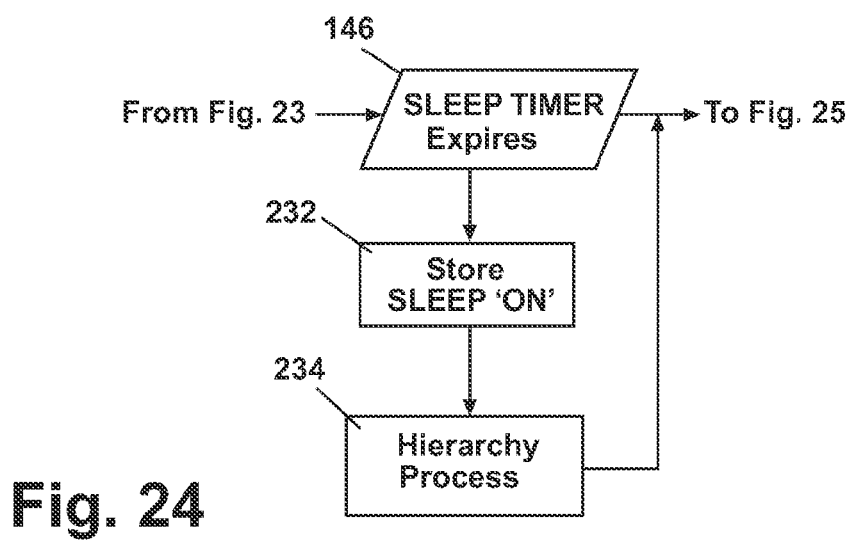
FIG. 24 is a flow chart drawing of a fifteenth event logic element of the microprocessor-based collection of event logic elements shown in FIG. 9 for evaluating a sleep timer event.

Referring now to FIGS. 9 and 24, the fifteenth event logic element 146 is initiated when the sleep timer of the local zone control module 110 expires, thereby activating the local zone control module 110 sleep mode and deactivating its associated zone 13. Information that the local zone control module 110 is in sleep mode is stored in the local zone control module 110 memory (sleeve register 366) that (step 232), followed by performance of the hierarchy process (step 234). This is followed by evaluation of the next event (event logic element 148) in the collection of event logic elements.

Figure 25:
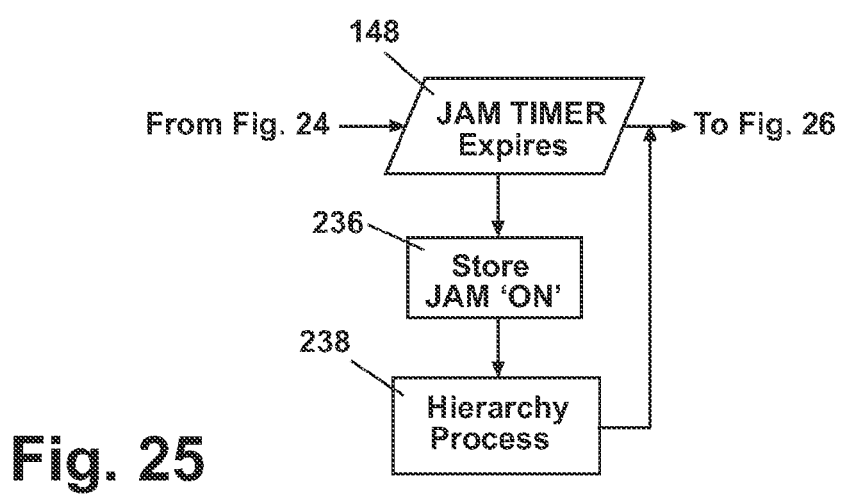
FIG. 25 is a flow chart drawing of a sixteenth event logic element of the microprocessor-based collection of event logic elements shown in FIG. 9 for evaluating a jam timer event.

Referring now to FIGS. 9 and 25, the sixteenth event logic element 148 is initiated when the local zone control module 110 jam timer has expired, indicating that the local zone is experiencing a jam condition. This information is stored in the local zone control module 110 memory (am register 368) (step 236), followed by performance of the hierarchy process (step 238). This is followed by evaluation of the next event (event logic element 150) in the collection of event logic elements.

Figure 26:
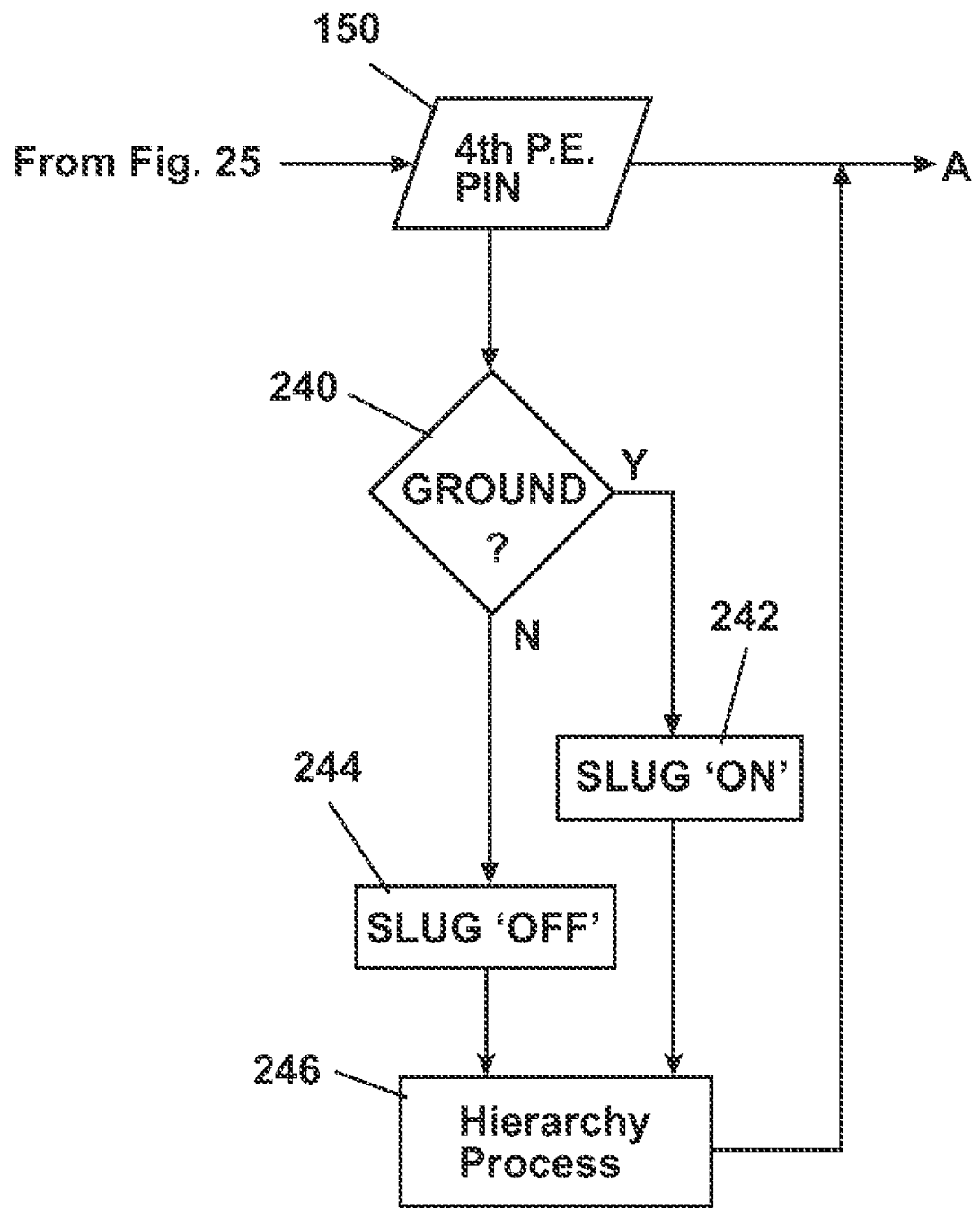
FIG. 26 is a flow chart drawing of a seventeenth event logic element of the microprocessor-based collection of event logic elements shown in FIG. 9 for evaluating a fourth photo-eye pin event.

Referring now to FIGS. 9 and 26, the seventeenth event logic element 150 is initiated when the local zone control module 110 is the last downstream zone control module, i.e. there are no further downstream zone control modules, and the zone control module 110 is connected directly to the installation computer 68 or a logic controller (LC) 78. In this case, the fourth pin of the 4-pin photo-eye connector is used for connection to and communication with the installation computer 68 or the logic controller (LC) 70 for control of certain customer-defined modes for handling packages at the end of the conveyor system 10. The seventeenth event logic element 150 evaluates whether the fourth pin of the photo-eye connector is utilized. The event logic element first evaluates whether this fourth pin is grounded (decision node 240). If it is, indicating that the zone control module is not the last downstream zone control module, a slug condition is activated (step 242), followed by performance of the hierarchy process (step 246). If the fourth pin is not grounded, indicating that the zone control module is the last downstream zone control module, the slug condition is deactivated (step 244), followed by performance of the hierarchy process (step 246).

When the seventeenth event logic element 150 and the hierarchy process have been completed, the collection of event logic elements returns to the first event 120 to repeat the collection of event logic elements.

Figure 27B:
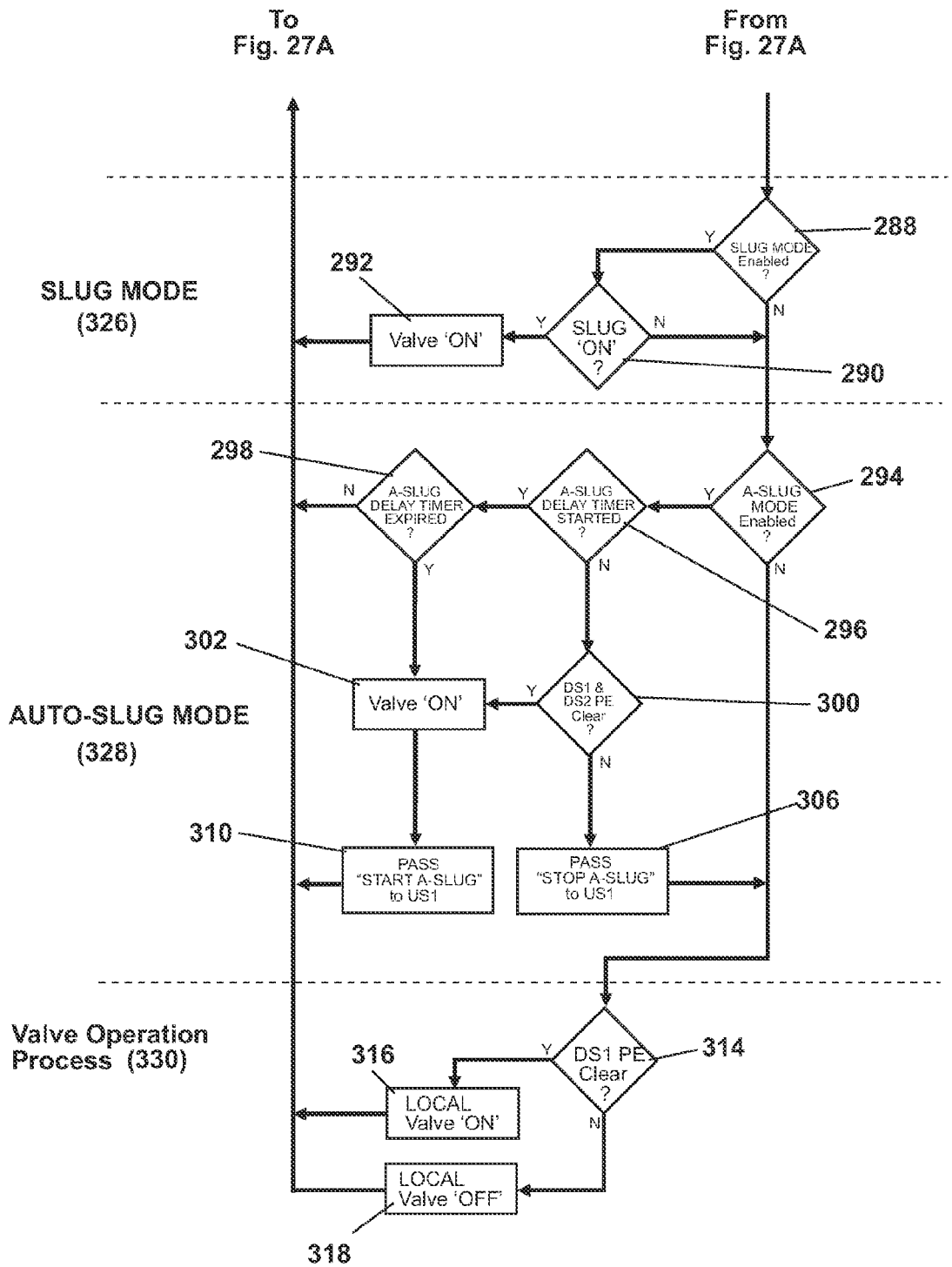
FIG. 27B is a continued flow chart of a second portion of a hierarchy logic process of the microprocessor-based collection of event logic elements shown in FIG. 9.

The hierarchy process is illustrated in FIGS. 27A and 27B. The hierarchy process is segregated into six processes: a sleep mode process 320, a downstream end module process 322, a jam mode process 324, a slug mode process 326, an auto-slug mode process 328, and a valve operation process 330.

The sleep mode process 320 first evaluates whether sleep mode is enabled (decision node 250). If sleep mode is not enabled, the downstream end module process 322 is performed. If sleep mode is enabled, the process then evaluates whether the zone control module is the first upstream zone control module at the beginning of the conveyor system 10 (decision node 252). If it is, the downstream end module process 322 is performed. If it is not, the process then evaluates whether the first upstream photo-eye, the second upstream photo-eye, and the local photo-eye are clear (decision node 254). If they are not, sleep mode is deactivated (step 258), the sleep timer is deactivated (step 260), and the downstream end module process 322 is performed. If they are, the process then evaluates whether sleep mode is activated (decision node 256). If it is, the local zone control module valve is deactivated (step 266), and the hierarchy process returns to the collection of event logic elements. If sleep mode is not activated, the process then evaluates whether the sleep timer is running (decision node 262). If it is not, the sleep timer is reset and activated (step 264), and the downstream end module process 322 is performed. If it is, the downstream end module process 322 is performed.

The downstream end module process 322 evaluates whether the local zone control module 110 is a downstream end module, i.e. the last module in the conveyor system 10 (decision node 268). If it is, the hierarchy process returns to the collection of event logic elements. If it is not, the jam mode process 324 is performed.

The jam mode process 324 first evaluates whether the jam mode is enabled (decision node 270). If it is not, the jam mode process 324 proceeds to the slug mode process 326. If it is, the process then evaluates whether the local photo-eye is blocked, and the first and second downstream photo-eyes are clear (decision node 272). If they are, the process then evaluates whether jam mode is activated (decision node 274). If they are not, the process evaluates whether the local zone control module 110 has received a message from the first downstream zone control module 112 (DS1) to activate jam mode (decision node 275). If such a message has not been received, jam mode is deactivated (step 276), a message is sent to the first upstream zone control module 116 (US1) to deactivate jam mode (step 278), and the jam timer is deactivated (step 280). The slug mode process 326 is then performed. If such a message has been received, the local zone control module 110 sends a message to the first upstream zone control module 116 (US1) to deactivate slug mode, deactivate auto-slug mode, and activate jam mode (step 286). The slug mode process 326 is then performed. If jam mode is activated (decision node 274), the local zone control module 110 sends a message to the first upstream zone control module 112 (DS1) to deactivate slug mode, deactivate auto-slug mode, and activate jam mode (step 286). The slug mode process 326 is then performed. If jam mode is deactivated, the process evaluates whether the jam timer is running (decision node 282). If it is not, the jam timer is activated and the slug mode process 326 is performed. If the jam timer is running, the slug mode process 326 is then performed.

The slug mode process 326 first evaluates whether slug mode is enabled (decision node 288). If it is not, the auto-slug mode process 328 is performed. If slug mode is enabled, the process evaluates whether slug mode is activated for the local zone control module 110 (decision node 290). If it is not, the auto-slug mode process 328 is performed. If it is, the pneumatic valve is activated (step 292), and the hierarchy process returns to the collection of event logic elements.

The auto-slug mode process 328 first evaluates whether the auto-slug mode is enabled (decision node 294). If it is not, valve operation process 330 is performed. If it is, the process then evaluates whether the auto-slug delay timer is activated (decision node 296). If the auto-slug delay timer is not activated, the process then evaluates whether the first downstream zone control module 112 (DS1) photo-eye and the second downstream zone control module 114 (DS2) photo-eye are clear (decision node 300). If they are not, the local zone control module 110 transmits a message to the first upstream zone control module 116 (US1) to terminate auto-slug mode (step 306). The valve operation process 330 is then performed. If the photo-eyes for the first and second downstream zone control modules 112 (DS1), 114 (DS2) are clear, the pneumatic valve for the local zone control module 110 is activated (step 302), the local zone control module 110 transmits a message to the first upstream zone control module 116 (US1) to initiate auto-slug mode (step 310), and the hierarchy process returns to the collection of event logic elements. If the auto-slug delay timer is activated (decision node 296), the process then evaluates whether the auto-slug delay timer has expired (decision node 298). If it has not, the hierarchy process returns to the collection of event logic elements. If the auto-slug delay timer has expired, the pneumatic valve for the local zone control module 110 is activated (step 302), the local zone control module 110 transmits a message to the first upstream zone control module 116 (US1) to initiate auto-slug mode (step 310), and the hierarchy process returns to the event logic elements as shown in FIG. 9.

The valve operation process 330 first evaluates whether the photo-eye for the first downstream zone control module 112 (DS1) is clear (decision node 314). If it is not, the pneumatic valve for the local zone control module 110 is deactivated (step 318) and the hierarchy process returns to the collection of event logic elements. If it is, the pneumatic valve for the local zone control module 110 is activated (step 316) and the hierarchy process returns to the collection of event logic elements.

Referring again to FIG. 1, several examples of the operation of the conveyor system 10 will now be described. These include normal operation, a jam condition, and an auto-slug condition.

Normal Operation

During normal operation, the cartons 30-34 are traveling down the conveyor (from left to right as viewed in FIG. 1). As the carton 30 passes in front of the photo-eye 22, the photo-eye registers a change from a "clear" condition to a "blocked"

condition. The zone control module 20 associated with that photo-eye, considered for purposes of this example as the local zone control module 110, has a neighborhood of upstream zone control modules 116 (US1), 118 (US2) and downstream zone control modules 112 (DS1), 114 (DS2), as previously described. The change in the photo-eye condition is an event that initiates the logic process shown in FIG. 9. The local photo-eye event logic element, shown in FIG. 10, is triggered. Since the local photo-eye 110 is blocked by the carton 30 (decision node 152), the delay timer is activated (step 154), and the logic process continues with subsequent event logic elements and the hierarchy process. If the local photo-eye 22 becomes unblocked by the downstream movement of the carton 30 before the delay timer expires, this again triggers the event logic element 120. The delay timer is then stopped (step 155) and the unblocked status of the local photo-eye 110 is stored. After an evaluation of whether "smart photo-eye" is enabled, the local photo-eye unblocked status is transmitted to the first upstream zone control module 116 (US1). The hierarchy process is then performed for the local zone control module 110.

Starting with the sleep mode process 320, the hierarchy process first evaluates at the decision node 250 whether sleep mode is enabled. If it is not, the hierarchy process proceeds to the downstream end module process 322. If sleep mode is enabled, the hierarchy process evaluates whether the local zone control module 110 is the furthest upstream zone control module (decision node 250). If it is, the hierarchy process proceeds to the downstream end module process 322, since the furthest upstream zone control module, as the first module in the conveyor system 10 to receive cartons, cannot be placed in sleep mode. If the local zone control module 110 is not the furthest upstream zone control module, the hierarchy process evaluates whether the first and second upstream photo-eyes and the local photo-eye are clear (decision node 254). If all three photo-eyes are clear, indicating that no cartons are within the local and two immediately upstream zones (US1 and US2), the local zone control module 110 may be placed in a sleep condition. If one of the three photo-eyes is not clear, indicating that a carton is within the local or two immediately upstream zones, then the sleep condition is turned off (if the local zone control module were in the sleep condition to begin with) (step 258) and the sleep timer is turned off (step 260), followed by performance of the downstream end module process 322. If the three photo-eyes are clear, the hierarchy subroutine evaluates whether the local zone control module 110 is in a sleep condition (decision node 256). If it is, the pneumatic valve is turned off, and the hierarchy process returns to the logic process for further evaluation of events. If the local zone control module 110 is not in a sleep condition but it is appropriate for the local zone control module 110 to be in a sleep condition, the hierarchy process evaluates whether the sleep timer is running (decision node 262). If it is, the hierarchy process proceeds to the downstream end module process 322. If it is not running, the sleep timer is reset and turned on, and the hierarchy process proceeds to the downstream end module process 322. In either case, when the sleep timer expires, the event logic element 146 will be triggered, the local zone control module 110 will be placed in a sleep condition (step 232), and the sleep mode process 320 will be repeated, this time resulting in the pneumatic valve being turned off (step 266) (assuming that the two upstream photo-eyes and the local photo-eye have not become blocked in the meantime).

If one of the three photo-eyes is not clear (decision node 254), resulting in performance of the downstream end module process 322, the hierarchy process evaluates whether the local zone control module 110 is the furthest downstream zone control module (decision node 268). If it is, the hierarchy process returns to the logic process for further evaluation of events. If it is not, the hierarchy process proceeds to the jam mode process 324, for evaluation of whether the local photo-eye 22 is blocked and if the blockage is the result of a jam condition. If jam mode is not enabled (decision node 270), the hierarchy process proceeds to the slug mode process 326. If jam mode is enabled, the hierarchy process evaluates whether the blockage is at the local photo-eye and the two immediately downstream photo-eyes are clear, indicating that a jam condition is at the local zone (decision node 272). If the local photo-eye is the only photo-eye that is blocked, the hierarchy process evaluates whether the status of the local zone control module 110 already reflects a jam condition (decision node 274). If it does, the local zone control module 110 transmits a "slug off" and an "auto-slug off" message to the first upstream zone control module 116 (US1) in order to prevent a slug-type conveyance of cartons downstream toward the jammed local zone control module 110. The local zone control module 110 also transmits a "jam on" message to the first upstream zone control module 116 (US1), thereby triggering the performance of the event logic element 144 by the first upstream zone control module 116 (US1). The first upstream zone control module 116 (US1) transmits the "jam on" message to its first upstream zone control module (step 230 shown in FIG. 23), thereby triggering the performance of the event logic element 144 by that zone control module, with the process being repeated upstream. The first upstream zone control module 116 (US1) will also perform the hierarchy process pursuant to the event logic element 144. Since one of the downstream photo-eyes will be blocked, the hierarchy subroutine will evaluate whether a "jam on" message has been received from the first downstream zone control module 112 (DS1) (decision node 275). Since a "jam on" message will have been received from the first downstream zone control module 112 (DS1), "slug off" and "auto-slug off" messages will be transmitted to the next upstream zone control module, and a "jam on" condition will be initiated for the subject zone control module (step 286).

If, pursuant to decision node 274, the status of the local zone control module 110 is not reflect a jam condition, the hierarchy process evaluates whether the jam timer is running (decision node 282) in order to evaluate whether the blockage of the photo-eye is reflective of a jam condition, or simply reflective of the normal carton movement down the conveyor line. If the jam timer is not running, the jam timer is turned on (step 284), and the slug mode process 326 is performed. If the jam timer is running, the slug mode process 326 is performed.

Pursuant to the slug mode process 326, if slug mode is not enabled (decision node 288), the hierarchy process proceeds to the auto-slug mode process 328. If slug mode is enabled, and the local zone control module is in a slug condition (decision node 290), the pneumatic valve is turned on (step 292) (if it has not already been turned on), thereby ensuring that cartons continue to be conveyed downstream, and the hierarchy process returns to the logic process for further evaluation of events. If the local zone control module is not in a slug condition, the hierarchy process proceeds to the auto-slug mode process 328.

Pursuant to the auto-slug mode process 328, the hierarchy process first evaluates whether the auto-slug mode is enabled (decision node 294). If it is not, the hierarchy process proceeds to the valve operation process 330. If auto-slug mode is enabled, the hierarchy process evaluates whether an auto-slug delay timer has been started (decision node 296). If it has been started, the hierarchy process evaluates whether the auto-slug delay timer has expired (decision node 298). If it has not expired, the hierarchy process returns to the logic process for further evaluation of events. If it has expired, indicating that it is appropriate for an auto slug condition to exist so that cartons can be quickly conveyed downstream, the local pneumatic valve is turned on (step 302) and the local zone control module 110 transmits a "start auto-slug" message to the first upstream zone control module 116 (US1) (step 310), thereby triggering the performance of the event logic element 124 (FIG. 12) in the first upstream zone control module 116 (US1). If the auto-slug delay timer has not been started, the hierarchy process evaluates whether the first and second downstream photo-eyes are clear (decision node 300), thereby indicating that the first and second downstream zones are available to receive cartons. If they are clear, the local pneumatic valve is turned on, and the local zone control module 110 transmits a "start auto-slug" message to the first upstream zone control module 116. If one of them is not clear, the local zone control module transmits a "stop auto-slug" message to the first upstream zone control module 116 (US1) (step 306), thereby triggering the event logic element 125 in the first upstream zone control module 116. This is followed by performance of the valve operation process 330.

Pursuant to the valve operation process 330, the hierarchy process first evaluates whether the first downstream photo-eye is clear (decision node 314). If it is not, the local pneumatic valve is turned off (step 318), thereby preventing further conveyance of cartons downstream, and the hierarchy process returns to the logic process for further evaluation of events. If it is clear, the local valve is turned on (step 316), thereby enabling further conveyance of cartons downstream, and the hierarchy process returns to the logic process for further evaluation of events.

Jam Condition

In this example, it is assumed that the carton 30 of FIG. 1 has become jammed and unable to move further downstream. With respect to this example, the local zone control module 110 (L) in FIG. 8 is the zone control module associated with the jammed carton. It is also assumed that the system configuration has a sleep timer interval of five seconds, sleep mode and jam mode are enabled, but auto-slug mode is not enabled. Since the local photo-eye remains blocked by the jammed carton 30 (decision node 152), the photo-eye delay timer is started (step 154), and will eventually expire, thereby triggering event logic element 122. The local photo-eye status is stored (step 166) and, assuming that the local photo-eye has not been designated a smart photo-eye, the first upstream zone control module 116 (US1) receives a message from the local zone control module 110 which it interprets as a message from a first downstream zone control module concerning the local photo-eye status (step 172). The hierarchy process is then performed, beginning with the sleep mode process 320. Since sleep mode is enabled (decision node 250), the process proceeds to decision node 252 for evaluation of whether the local zone control module 110 is the first upstream zone control module. Assuming that it is not, the process evaluates whether the two upstream and local photo-eyes are clear (decision node 254). Since the local photo-eye is not clear due to the jam condition, the sleep condition is turned off (step 258) and the sleep timer is turned off (step 260). The downstream end module process 322 is then evaluated (decision node 268). Assuming that the local zone control module 110 is not the furthest downstream zone control module, the jam mode process 324 is performed. Since jam mode is enabled (decision node 270), the process evaluates whether the local photo-eye is blocked (which it is, because of the jam condition) and whether the first two downstream photo-eyes are clear (decision node 272). If the two downstream photo-eyes are clear, the process evaluates whether a jam condition exists at the local zone control module 110 (decision node 274). Since it does, the local zone control module 110 transmits "slug off" and "auto-slug off" messages to the first upstream zone control module 116 (US1), and transmits a "jam on" message to the first upstream zone control module 116 (US1), thereby triggering the event logic element 144 to the first upstream zone control module 116 (US1). The "jam on" message will be propagated upstream pursuant to the event logic element 144. At some upstream zone control module, the local and first two downstream photo-eyes will be clear since the jam condition will exist further downstream (decision node 272). Since a "jam on" message will have been received from the first downstream zone control module 112 (DS1) (decision node 275), the zone control module will transmit "slug off" and "auto-slug off" messages to the next upstream zone control module, and will transmit a "jam on" message to the next upstream zone control module, thereby triggering the event logic element 144 to the next upstream zone control module.

Auto-Slug Condition

With respect to this example, it is assumed that the system configuration has a sleep timer interval of five seconds, and that sleep mode, jam mode, and auto-slug mode are enabled, and the slug mode is disabled. Referring to FIG. 1, it is also assumed that the local zone control module 110 is associated with one of the optical sensors 22 between the cartons 30, 32 and, thus, is clear, that the second upstream photo-eye is blocked by the carton 32, and that the local zone control module 110 has received a message from the first downstream zone control module 112 (DS1) to activate the auto-slug feature (event 124). Since the jam mode is not activated (decision node 178), the auto-slug delay timer for the local zone control module 110 is activated (step 180), and the hierarchy process is initiated.

Since, pursuant to the above assumptions, sleep mode is enabled (decision node 250), the local zone control module 110 is not an upstream end zone control module (decision node 252), and the second upstream photo-eye is not clear (decision node 254), the sleep condition is turned off (step 258) and the sleep timer is turned off (step 260), and the downstream end module process 322 is performed.

Pursuant to the above assumptions, the local zone control module 110 is not a downstream end zone control module (decision node 268), and jam mode is enabled (decision node 270). Since the local photo-eye is not blocked, the conditions of decision node 272 are not satisfied. The local zone control module 110 has not received a "jam on" message from the first downstream zone control module 112 (DS1) (decision node 275), so the local zone control module 110 sets the jam condition to "off" (step 276), indicating the absence of a jam condition, sends a "jam off" message to the first upstream zone control module 116 (US1) (step 278), and turns the jam timer off (step 280). The slug mode process 326 is then performed.

Slug mode is not enabled (decision node 288) pursuant to the above assumptions, but auto-slug mode is enabled (decision node 294). The auto-slug mode process 328 first evaluates whether the auto-slug delay timer has been started (decision node 296). If the auto-slug delay timer has not been started, and the first and second downstream photo-eyes are clear (decision node 300), or if the auto-slug delay timer has been started (decision node 296) and has expired (decision node 298), the pneumatic valve is activated (step 302) and the local zone control module 110 transmits a message to the first upstream zone control module 116 (US1) to initiate an auto-slug condition (step 310), thereby triggering event logic element 124 in the first upstream zone control module 116 (US1). This process is propagated upstream so that the cartons 32, 34 are quickly transferred along the conveyor system 10. If the auto-slug delay timer has not expired (decision node 298), the hierarchy process returns to the logic process for further evaluation of events. If the auto-slug delay timer has not been started, and one of the first and second downstream photo-eyes are not clear (decision node 300), the local zone control module 110 transmits a message to the first upstream zone control module 116 (US1) to stop the auto-slug condition (step 306). The valve operation process 330 is then performed.

Pursuant to the valve operation process 330, if the first downstream photo-eye is clear (decision node 314), the local pneumatic valve is turned on (step 316) to convey cartons downstream. If the first downstream photo-eye is not clear, the local pneumatic valve is turned off (step 318), to prevent further conveyance of cartons through the local zone. In either case, the hierarchy process returns to the logic process for continued performance of event logic elements.

The conveyor system 10 described herein provides a high degree of control and flexibility. The collection of event logic elements and hierarchy process described herein provide a superior means of controlling and monitoring the performance of the conveyor system and providing appropriate responses to different performance conditions, such as package jams or excessive capacity. The ability to select different mode of operation, such as jam mode or auto-slug mode, and to place selected zones of the conveyor system 10 in sleep mode, provide a degree of flexibility precisely tailored to the conditions associated with a specific run of packages. Energy savings can be realized by employing sleep mode, and, because the location of a jam condition can be precisely identified and its location propagated to the installation computer system 68 through the interpreter 60, package jams can be quickly corrected, thereby saving operator time and resources. Because zone control modules are identified by position in the conveyor system 10 rather than by a unique identification number, a zone control module can be quickly replaced without the necessity of reprogramming a computer with a new module identification number. Similarly, the conveyor system 10 can be readily expanded with additional zone control modules without the necessity of reprogramming the new module identification numbers.

The zone control modules, interpreter, PDA, server and all other components can be operably interconnected to one another in a manner which would be apparent to one skilled in the art and the exemplary embodiments of such operable interconnection described herein shall not be construed as limiting on the invention since any communications-enabled interconnection between zone control modules and the other components referred to above can be employed, such as typical wire-based connections (Ethernet, coaxial, connecter-based conduit, etc.) or wireless communications in any of the accepted network protocols, without departing from the scope of this invention.

The collection of event logic events 120-150 and the processes 320-330 comprising the hierarchy process have been arranged in exemplary sequences in the preferred embodiment described herein. However, the event logic events 120-150 and the processes 320-330 may be arranged in other sequences which would be apparent to one skilled in the art without departing from the scope of the invention, and the exemplary sequences described herein shall not be construed as limiting on the invention.

While the invention has been specifically described in connection with certain specific embodiments thereof, it is to be understood that this is by way of illustration and not of limitation. Reasonable variation and modification are possible within the scope of the foregoing disclosure and drawings without departing from the scope of the invention.

What is claimed is:

1. A system for controlling zones in a conveyor system for handling objects traveling therealong comprising:
    a plurality of controllers, each having a signal processor/generator, memory allocation having at least one event logic program element, and at least one two-way controller communication port;
    a plurality of position-sensitive program elements, each associated with a controller for identifying the position of a controller in a series of controllers;
    a plurality of object detectors, each adapted to be operably coupled with a controller;
    a plurality of conveyor zone actuators, each adapted to be operably coupled with a controller; and
    at least one two-way controller communication port operably coupled with at least one of an adjacent upstream controller communication port and an adjacent downstream controller communication port, an event logic program element being responsive to inputs from at least two adjacent upstream controller communication ports and at least two adjacent downstream controller communication ports;
    whereby, when each object detector and each conveyor zone actuator is coupled with a controller, and when at least one two-way controller communication port is coupled with one of at least two adjacent upstream controller communication ports and at least two adjacent downstream controller communication ports, each signal processor/generator is responsive to communication from an object detector and communications from at least one adjacent upstream and downstream controller, and an at least one event logic program element can control the state of a conveyor zone actuator.

2. The system of claim 1 wherein the controller initiates the operation of a delay timer in response to the presence of an object in a zone local to the controller.

3. The system of claim 2 wherein the controller terminates the operation of the delay timer in response to the absence of an object in a zone local to the controller for a predetermined period of time.

4. The system of claim 2 wherein the controller communicates the absence of the object to at least one of an adjacent upstream controller.

5. The system of claim 1 wherein the controller stores a communication from the object detector in the controller to serve as a reference for further evaluation of the presence of an object in the zone.

6. The system of claim 5 wherein the controller communicates the communication from the object detector to at least one of an adjacent upstream controller.

7. The system of claim 1 wherein the controller initiates a response to a signal representative of an auto-slug condition received from at least one adjacent downstream controller.

8. The system of claim 7 wherein the controller evaluates the existence of a jam condition in a zone local to the controller.

9. The system of claim 8 wherein the controller initiates an operation of a delay timer in response to a detected jammed object condition.

10. The system of claim 7 wherein the controller stores the signal relating to an auto-slug condition to serve as a reference for evaluation of a subsequently received signal representative of a jammed object condition.

11. The system of claim 10 wherein the controller terminates an operation of a delay timer.

12. The system of claim 10 wherein the controller communicates the signal representative of the jammed object condition to at least one adjacent upstream controller.

13. The system of claim 1 wherein the controller initiates a response to a change in the operation of at least one of a delay timer, a jam timer, a sleep timer, an auto-slug delay timer, and a photo-eye delay timer.

14. The system of claim 13 wherein the controller stores an auto-slug setting representative of whether at least one of the plurality of controllers is initiating a slug condition.

15. The system of claim 13 wherein the controller stores a sleep setting representative of the initiation of a sleep condition to serve as a reference for further evaluation of a sleep condition.

16. The system of claim 13 wherein the controller stores a jam setting representative of a jam condition to serve as a reference for further evaluation of a jam condition.

17. The system of claim 1 wherein the controller initiates a response to a signal received that is representative of the presence of an object in an upstream zone.

18. The system of claim 17 wherein the controller stores the signal relating to the presence of an object local to an upstream controller to serve as a reference for further evaluation of the presence of an object local to an upstream controller.

19. The system of claim 18 wherein the controller communicates a signal to at least one adjacent downstream controller representative of a state of the upstream controller.

20. The system of claim 1 wherein the controller initiates a response to a signal representative of the presence of an object local to a downstream controller.

21. The system of claim 20 wherein the controller stores the signal relating to the presence of an object local to a downstream controller to serve as a reference for evaluation of a subsequent received signal relative to the presence of an object local to a downstream controller.

22. The system of claim 21 wherein the controller communicates the signal to at least one adjacent upstream controller representative of a state of the downstream controller.

23. The system of claim 1 wherein the controller initiates a response to a signal from an adjacent downstream controller relating to a status of an object detector as a smart object detector.

24. The system of claim 23 wherein the controller communicates a signal to at least one adjacent upstream controller representative of a state of the downstream controller as having a smart object detector.

25. The system of claim 1 wherein the controller initiates a response to a signal from an adjacent upstream controller concerning a release of an object from an upstream zone.

26. The system of claim 25 wherein the controller determines whether the controller is adjacent a downstream controller.

27. The system of claim 26 wherein the controller communicates a signal to at least one adjacent downstream controller representative of the controller being adjacent to a downstream controller.

28. The system of claim 26 wherein the controller operates the actuator corresponding to the controller in response to a received signal in order to actuate the actuator and operate the movement of objects in the zone local to the controller.

29. The system of claim 1 wherein the controller initiates a response to a signal received from at least one upstream controller that is representative of a change in a slug condition.

30. The system of claim 29 wherein the controller determines whether the controller is adjacent a downstream controller.

31. The system of claim 30 wherein the controller communicates a signal to at least one adjacent downstream controller representative of a slug condition signal from the at least one adjacent upstream controller.

32. The system of claim 30 wherein the controller updates a slug condition in the local controller in response to the received signal.

33. The system of claim 32 wherein the controller communicates a slug condition to at least one adjacent upstream controller to update a slug condition in the at least one adjacent upstream controller.

34. The system of claim 1 wherein the controller initiates a response to a signal from an adjacent downstream controller relating to presence of an object local to the zone of the adjacent downstream controller.

35. The system of claim 34 wherein the controller stores the signal from the adjacent downstream controller representative of the presence of the object local to the zone of the adjacent downstream controller.

36. The system of claim 1 wherein the controller initiates a response to a signal received from at least one downstream controller representative of a change in a slug condition.

37. The system of claim 36 wherein the controller stores the signal from the at least one downstream controller representative of the change in the slug condition to serve as a reference for evaluation of a subsequent received signal representative of a change in a slug condition.

38. The system of claim 37 wherein the controller determines whether a jam condition exists.

39. The system of claim 38 wherein the controller communicates a signal representative of the slug condition to at least one upstream controller to propagate the slug condition to the at least one upstream controller if the jam condition is determined not to exist.

40. The system of claim 1 wherein the controller initiates a response to a signal received from at least one downstream controller representative of a jam condition.

41. The system of claim 40 wherein the controller communicates the signal representative of the jam condition to at least one upstream controller to propagate the jam condition to the at least one upstream controller.

42. The system of claim 1 wherein the controller initiates a response to the expiration of a sleep timer.

43. The system of claim 42 wherein the controller stores information representative of the initiation of a sleep condition to serve as a reference for further evaluation of the sleep condition of the controller.

44. The system of claim 1 wherein the controller initiates a response to an expiration of a jam timer.

45. The system of claim 44 wherein the controller stores information representative of an activation of a jam condition to serve as a reference for further evaluation of the jam condition of the controller.

46. The system of claim 1 wherein the controller determines whether the operable interconnections of the controller to at least one of the upstream controller and the downstream controller is in a ground state.

47. The system of claim 46 wherein the controller initiates a slug condition in the controller if the detecting step detects a ground state.

48. The system of claim 46 wherein the controller terminates a slug condition in the controller if the detecting step does not detect a ground state.

49. The system of claim 1 wherein the controller initiates a response to a determination of whether a sleep mode is enabled.

50. The system of claim 49 wherein the controller determines whether the controller is a downstream end controller if sleep mode is not enabled.

51. The system of claim 49 wherein the controller determines whether the controller is an upstream end controller if sleep mode is enabled.

52. The system of claim 51 wherein the controller determines whether the controller and at least one upstream controller have detected the presence of an object.

53. The system of claim 52 wherein the controller initiates a sleep condition and deactivates a sleep timer if the controller and at least one adjacent upstream controller detect the presence of an object in a zone local to the at least one of the controller and the at least one adjacent upstream controller.

54. The system of claim 52 wherein the controller evaluates whether a sleep condition is active if the controller and at least one adjacent upstream controller do not detect the presence of an object in a zone local to the controller and at least one adjacent upstream controller.

55. The system of claim 54 wherein the controller deactivates the actuator corresponding to the controller local to the zone if a sleep condition is active.

56. The system of claim 54 wherein the controller evaluates whether a sleep timer is running if the sleep condition is not active.

57. The system of claim 56 wherein the controller resets and activates the sleep timer if the sleep timer is not running.

58. The system of claim 57 wherein the controller evaluates whether the controller is a downstream end controller if the sleep timer is running.

59. The system of claim 1 wherein the controller initiates a response to a determination of whether the controller is a downstream end controller.

60. The system of claim 59 wherein the controller determines whether a jam mode is enabled if the controller is not a downstream end controller.

61. The system of claim 1 wherein the controller initiates a response to a determination of whether a jam mode is enabled.

62. The system of claim 61 wherein the controller determines whether an object is present in a zone local to the controller and an object is not present in a first downstream zone and a second downstream zone.

63. The system of claim 62 wherein the controller determines whether a signal representative of a jam condition in the first downstream controller has been received by the controller if an object is not present in a zone local to the controller and an object is present in both the first downstream zone and the second downstream zone.

64. The system of claim 63 wherein the controller deactivates the jam condition, sending a signal representative of the jam condition to the first upstream controller, and deactivating a jam timer, if a signal representative of an active jam condition has not been received from the first downstream controller.

65. The system of claim 63 wherein the controller sends a signal representative of a terminated slug condition, deactivating an auto-slug condition, and sending a signal representative of an activated jam condition to the first upstream controller if a signal representative of an activated jam condition has been received from the first downstream controller.

66. The system of claim 62 wherein the controller determines whether a jam condition exists if an object is present in zone local to the controller and an object is not present in at least one of the first downstream zone and the second downstream zone.

67. The system of claim 66 wherein the controller determines whether a jam timer is running if a jam condition does not exist.

68. The system of claim 67 wherein the controller activates the jam timer if the jam timer is not running.

69. The system of claim 67 wherein the controller evaluates whether a slug mode is enabled if the jam timer is running.

70. The system of claim 66 wherein the controller sends a signal representative of a deactivated slug condition and a deactivated auto-slug condition local to the controller, and sending a signal representative of an activated jam condition to the first upstream controller if a jam condition is detected.

71. The system of claim 1 wherein the controller initiates a response to a determination of whether a slug mode is enabled.

72. The system of claim 71 wherein the controller determines whether a current slug condition exists if a slug mode is enabled.

73. The system of claim 72 wherein the controller determines whether an auto-slug mode is enabled if the current slug condition does not exist.

74. The system of claim 72 wherein the controller activates the actuator corresponding to the controller local to the zone if the slug condition does exist.

75. The system of claim 71 wherein the controller determines whether an auto-slug mode is enabled if a slug mode is not enabled.

76. The system of claim 1 wherein the controller initiates a response to a determination of whether auto-slug mode is enabled.

77. The system of claim 76 wherein the controller determines whether a first downstream object detector does not detect an object if an auto-slug mode is not enabled.

78. The system of claim 76 wherein the controller evaluates whether an auto-slug delay timer has been started if auto-slug mode is enabled.

79. The system of claim 78 wherein the controller determines whether a first downstream object detector and a second downstream object detector each do not detect an object if the auto-slug delay timer is not running.

80. The system of claim 79 wherein the controller sends a signal to a first upstream controller representative of a stop auto-slug condition if the first downstream object detector or the second downstream object detector each do not detect the object.

81. The system of claim 79 wherein the controller activates the actuator corresponding to the controller local to the zone if the first downstream object detector and the second downstream object detector each do not detect an object.

82. The system of claim 81 wherein the controller sends a signal to a first upstream controller representative of a start auto-slug condition.

83. The system of claim 78 wherein the controller determines whether the auto-slug delay timer has expired if the auto-slug delay timer has been started.

84. The system of claim 83 wherein the controller activates the actuator corresponding to the controller local to the zone if the auto-slug delay timer has expired.

85. The system of claim 84 wherein the controller sends a signal to a first upstream controller representative of a start auto-slug condition.

86. The system of claim 1 wherein the controller initiates a response to a determination of a change in state of a first downstream object detector.

87. The system of claim 86 wherein the controller activates the actuator corresponding to the controller local to the zone if the first downstream object detector does not detect an object.

88. The system of claim 86 wherein the controller deactivates the actuator corresponding to the controller local to the zone if the first downstream object detector detects an object.

89. The system of claim 1 wherein the controller activates the particular one of the plurality of actuators in response to a signal initiated by the at least one object in the particular zone.

90. The system of claim 1 wherein the controller performs a plurality of event logic elements for evaluating and controlling the position of the at least one object in the particular zone, and transmits a signal relating to the position of the at least one object to the at least one of the adjacent upstream controller and the adjacent downstream controller.

91. The system of claim 90 wherein the controller determines whether to actuate a particular one of the actuators responsive to a hierarchy process called by an event logic element based on the enablement of at least one function mode.

92. The system of claim 91 wherein the at least one function mode comprises at least one of a sleep mode, a downstream end module mode, a jam mode, a slug mode, an auto-slug mode, and a valve operation mode.

* * * * *

UNITED STATES PATENT AND TRADEMARK OFFICE
CERTIFICATE OF CORRECTION

PATENT NO. : 7,591,365 B2 Page 1 of 1
APPLICATION NO. : 11/464042
DATED : September 22, 2009
INVENTOR(S) : Knepple et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 284 days.

Signed and Sealed this

Fourteenth Day of December, 2010

David J. Kappos
*Director of the United States Patent and Trademark Office*